United States Patent
Dejneka et al.

(10) Patent No.: US 11,292,741 B2
(45) Date of Patent: Apr. 5, 2022

(54) ION-EXCHANGEABLE LITHIUM-CONTAINING ALUMINOSILICATE GLASSES

(71) Applicant: CORNING INCORPORATED, Corning, NY (US)

(72) Inventors: Matthew John Dejneka, Corning, NY (US); Alexander I Priven, Chungchongnam-do (KR)

(73) Assignee: CORNING INCORPORATED, Corning, NY (US)

( * ) Notice: Subject to any disclaimer, the term of this patent is extended or adjusted under 35 U.S.C. 154(b) by 33 days.

(21) Appl. No.: 16/705,402

(22) Filed: Dec. 6, 2019

(65) Prior Publication Data
US 2020/0189962 A1    Jun. 18, 2020

Related U.S. Application Data

(60) Provisional application No. 62/778,418, filed on Dec. 12, 2018.

(51) Int. Cl.
   *C03C 3/083*    (2006.01)
   *C03C 3/097*    (2006.01)
   (Continued)

(52) U.S. Cl.
   CPC .............. *C03C 3/083* (2013.01); *C03C 3/095* (2013.01); *C03C 3/097* (2013.01); *C03C 21/00* (2013.01); *C03C 2201/50* (2013.01)

(58) Field of Classification Search
   CPC ......... C03C 3/083; C03C 3/095; C03C 3/097; C03C 21/00; C03C 2201/50
   See application file for complete search history.

(56) References Cited

U.S. PATENT DOCUMENTS 3,166,428 A   1/1965 Thomas
3,420,684 A   1/1969 Hagedorn
(Continued)

FOREIGN PATENT DOCUMENTS

EP   0985644 B1 * 8/2005  ............. C03C 3/095
GB   1221851 A     3/1968
(Continued)

OTHER PUBLICATIONS

Invitation To Pay Additional Fees of the International Searching Authority PCT/US2019/064426; dated Mar. 26, 2020; 14 Pages; European Patent Office.
(Continued)

*Primary Examiner* — Karl E Group
*Assistant Examiner* — Cameron K Miller
(74) *Attorney, Agent, or Firm* — John P. McGroarty

(57) ABSTRACT

Glass compositions having from 50 to 80 mol % $SiO_2$, less than or equal to 25 mol % $Al_2O_3$, from 6.5 to 10.0 mol % $Li_2O$ and, optionally, other components, such as alkali metal oxides, alkaline earth metal oxides, zinc oxide, phosphorus oxides, rare earth metal oxides, boron oxide, and small amounts of other species, such as titania, zirconia, and tin oxide. The glass compositions are characterized by zero or positive values of the ratios, in terms of mol %: $Al_2O_3-\Sigma R_2O \geq 0$, or $Al_2O_3-\Sigma R_2O-\Sigma RO \geq 0$, or $Al_2O_3-\Sigma R_2O-\Sigma RO-P_2O_5 \geq 0$, where $R_2O$ means alkali metal oxides and RO means divalent metal oxides. The glass compositions may have a liquidus viscosity greater than or equal to 1000 Poises to less than or equal to 300,000 Poises.

19 Claims, 6 Drawing Sheets

(51) Int. Cl.
*C03C 3/095* (2006.01)
*C03C 21/00* (2006.01)

(56) References Cited

U.S. PATENT DOCUMENTS

| | | | |
|---|---|---|---|
| 3,625,718 | A | 12/1971 | Petticrew |
| 3,642,504 | A | 2/1972 | Petzold et al. |
| 3,834,911 | A | 9/1974 | Hammel |
| 3,907,577 | A | 9/1975 | Kiefer |
| 5,326,728 | A | 7/1994 | Boury et al. |
| 5,446,008 | A | 8/1995 | Krolla et al. |
| 5,997,977 | A | 12/1999 | Zou et al. |
| 6,197,480 | B1 | 3/2001 | Iguchi et al. |
| 6,214,429 | B1 | 4/2001 | Zou et al. |
| 6,300,264 | B1 | 10/2001 | Ohara |
| 6,376,403 | B1 | 4/2002 | Koyama et al. |
| 6,537,938 | B1 | 3/2003 | Miyazaki |
| 6,689,704 | B2 | 2/2004 | Ota et al. |
| 6,914,371 | B2 | 7/2005 | Martin et al. |
| 7,071,131 | B2 | 7/2006 | Comte et al. |
| 7,141,521 | B2 | 11/2006 | Siebers et al. |
| 7,199,066 | B2 | 4/2007 | Horsfall et al. |
| 7,476,633 | B2 | 1/2009 | Comte et al. |
| 7,566,673 | B2 | 7/2009 | Kawai |
| 7,754,630 | B2 | 7/2010 | Doehring et al. |
| 8,178,452 | B2 | 5/2012 | Shimizu et al. |
| 8,252,707 | B2 | 8/2012 | McGinnis et al. |
| 8,338,319 | B2 | 12/2012 | McGinnis et al. |
| 8,377,835 | B2 | 2/2013 | Tomeno et al. |
| 8,563,450 | B2 | 10/2013 | Hofmann et al. |
| 8,652,979 | B2 | 2/2014 | Murata |
| 2005/0076676 | A1 | 4/2005 | Siebers et al. |
| 2005/0143250 | A1 | 6/2005 | Fujiwara et al. |
| 2005/0250639 | A1* | 11/2005 | Siebers ............... C03C 21/008 501/68 |
| 2006/0279217 | A1* | 12/2006 | Peuchert ............... H01J 61/34 313/634 |
| 2008/0207427 | A1 | 8/2008 | Ohkawa et al. |
| 2009/0286667 | A1 | 11/2009 | Siebers et al. |
| 2011/0039681 | A1 | 2/2011 | Lecomte |
| 2011/0070444 | A1 | 3/2011 | Fujiwara et al. |
| 2012/0015150 | A1 | 1/2012 | Suzuki |
| 2012/0052271 | A1 | 3/2012 | Gomez et al. |
| 2013/0210962 | A1 | 8/2013 | Hofmann et al. |
| 2013/0217807 | A1 | 8/2013 | McGinnis et al. |
| 2014/0193643 | A1 | 7/2014 | Akhtar et al. |
| 2015/0030827 | A1 | 1/2015 | Gomez et al. |
| 2015/0119227 | A1 | 4/2015 | Sawai |
| 2015/0259243 | A1 | 9/2015 | McGinnis et al. |
| 2016/0326045 | A1 | 11/2016 | Li |
| 2017/0174556 | A1 | 6/2017 | Miyabe et al. |
| 2017/0341973 | A1 | 11/2017 | Gross et al. |
| 2018/0127303 | A1* | 5/2018 | Gross ............... C03C 3/085 |
| 2019/0127265 | A1 | 5/2019 | Dejneka et al. |
| 2019/0161386 | A1 | 5/2019 | Gross et al. |

FOREIGN PATENT DOCUMENTS

| | | | |
|---|---|---|---|
| GB | 1391384 | A | 4/1975 |
| JP | 2000063144 | A | 2/2000 |
| JP | 2000159540 | A | 6/2000 |
| JP | 2001076336 | A | 3/2001 |
| JP | 2001134925 | A | 5/2001 |
| JP | 2002260216 | A | 9/2002 |
| JP | 2003201144 | A | 7/2003 |
| JP | 2004099370 | A | 4/2004 |
| JP | 2004168578 | A | 6/2004 |
| JP | 2004244226 | A | 9/2004 |
| JP | 2004277252 | A | 10/2004 |
| JP | 2004352571 | A | 12/2004 |
| JP | 2008115071 | A | 5/2008 |
| JP | 2010116276 | A | 5/2010 |
| WO | 2012/027660 | A1 | 3/2012 |
| WO | 2017/205605 | A1 | 11/2017 |
| WO | 2019/089602 | A1 | 5/2019 |
| WO | 2019/108762 | A1 | 6/2019 |

OTHER PUBLICATIONS

Chartrand et al; "Modeling the Charge Compensation Effect in Silica-Rich Na2O—K2O—Al2O3—SiO2 Melts"; Calphad vol. 23; No. 2; pp. 219-230 (1999.

Toropov et la; "The Diagram of State of the Ternary System BaO—Al2O3—SiO2"; Izv. Akad. Nauk SSSR, Ser. Khim., No. 5, 753-764 (1954.

* cited by examiner

ION-EXCHANGEABLE LITHIUM-CONTAINING ALUMINOSILICATE GLASSES

CROSS-REFERENCE TO RELATED APPLICATIONS

This application claims the benefit of priority under 35 U.S.C. § 119 of U.S. Provisional Application Ser. No. 62/778,418 filed on Dec. 12, 2018, the content of which is relied upon and incorporated herein by reference in its entirety.

BACKGROUND

Field

The present specification generally relates to glass compositions suitable for use as cover glass for electronic devices. More specifically, the present specification is directed to lithium-containing aluminosilicate glasses that may be formed into cover glass for electronic devices and may be strengthened by ion exchange strengthening.

Technical Background

The mobile nature of portable devices, such as smart phones, tablets, portable media players, personal computers, and cameras, makes these devices particularly vulnerable to accidental dropping on hard surfaces, such as the ground. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

One conventional way to strengthen glass articles, such as cover glass for portable electronics, is by ion exchange strengthening processes. In ion exchange strengthening processes, the glass article is placed in a molten salt bath. The salt in the molten salt bath generally comprises alkali metal cations that are larger than the alkali metal components in the glass article. For example, if the glass article comprises sodium, then the salt in the molten salt bath will generally comprise potassium or larger alkali cations. During the ion exchange chemical strengthening process, the process conditions—such as temperature, pressure, etc.—are such that the cations from the salt bath replace (or are exchanged for) the alkali metals in the glass article. This exchange of smaller ions in the glass article for the larger ions in the salt bath results in a stiffening of the glass matrix that causes a compressive stress in the layer of the glass article where the ions are exchanged. This compressive stress results in a strengthened portion of the glass article that is more resistant to damage than glass articles that do not have compressive stress layers.

However, balancing the alkali metals traditional needed to perform ion exchange processes in a glass article with the other components of a glass article to balance the properties of the glass article is difficult. For example, increasing the amount of alkali metals in the glass composition may improve the ion exchangeability of the glass article, but it may result in other, less desirable changes of properties. Accordingly, a need exists for glasses that can be strengthened, such as by ion exchange, and that have the mechanical properties that allow them to be formed as desired.

SUMMARY

A first aspect includes a glass composition comprising: from greater than or equal to 50.0 mol % to less than or equal to 65.0 mol % $SiO_2$; from greater than or equal to 14.0 mol % and less than or equal to 25.0 mo.% $Al_2O_3$; from greater than or equal to 7.0 mol % to less than or equal to 10.0 mol % $Li_2O+Na_2O$; greater than or equal to 7.0 mol % $Li_2O$; from greater than or equal to 0.0 mol % to less than or equal to 3.0 mol % $P_2O_5$; and from greater than or equal to 0.0 mol % to less than or equal to 8.0 mol % alkaline earth metals, wherein the glass composition is essentially free of F and oxides of K, Zr, Ti, Pb and Ta.

A second aspect includes a glass composition of the first aspect, wherein the difference $Al_2O_3-Li_2O-Na_2O-K_2O$, calculated on molar basis, is greater than or equal to 7.0 mol %.

A third aspect includes a glass composition of any one of the first or second aspects, wherein the difference $Al_2O_3-Li_2O-Na_2O-K_2O-RO$, calculated on molar basis, is greater than or equal to 3.0 mol %, wherein RO is the total sum of divalent metal oxides.

A fourth aspect includes a glass composition of any one of the first to third aspects, wherein the difference $Al_2O_3-R_2O-RO-P_2O_5$, calculated on molar basis, is greater than or equal to 2.5 mol %, wherein $R_2O$ is the total sum of alkali metal oxides and RO is the total sum of divalent metal oxides.

A fifth aspect includes a glass composition of any one of the first to fourth aspects, wherein the glass composition comprises: a liquidus viscosity of at least about 1000 Poises; a Young's modulus of at least about 80 GPa; a 200 P temperature of less than or equal to 1650° C.; an annealing point greater than or equal to 600° C.; a specific modulus of at least 30 GPa·cm$^3$/gram; and a fracture toughness of greater than or equal to 0.78 MPa·m$^{1/2}$.

A sixth aspect includes a glass composition of any one of the first to fifth aspects, wherein the glass composition has a liquidus viscosity of greater than or equal to 10000 Poises, and a 200 P temperature less than 1450° C.

A seventh aspect includes a glass composition of any one of the first to sixth aspects, wherein the glass composition comprises from greater than or equal to 0.0 mol % to less than or equal to 15.0 mol % rare earth oxides.

An eighth aspect includes a glass composition comprising: from greater than or equal to 50.0 mol % to less than or equal to 65.0 mol % $SiO_2$; from greater than or equal to 12.0 mol % to less than or equal to 20.0 mol % $Al_2O_3$; and from greater than or equal to 6.5 mol % to less than or equal to 10.0 mol % $Li_2O$, wherein the glass composition is essentially free of $ZrO_2$ and $TiO_2$, and the difference $Al_2O_3-Li_2O-Na_2O-K_2O-RO$, calculated on a molar basis, is greater than or equal to 4.5 mol %, wherein RO is the total sum of divalent metal oxides.

A ninth aspect includes a glass composition of the eighth aspect, wherein the difference $Al_2O_3-R_2O-RO$, calculated on molar basis, is greater than or equal to 7.5 mol %, wherein $R_2O$ is the total sum of alkali metal oxides and RO is the total sum of divalent metal oxides.

A tenth aspect includes a glass composition of any one of the eighth or ninth aspects, wherein the glass composition comprises greater than or equal to 7.0 mol % $Li_2O$.

An eleventh aspect includes a glass composition of any one of the eighth to tenth aspects, wherein the difference $Al_2O_3-R_2O-RO-P_2O_5$, calculated on molar basis, is greater than or equal to 4.0 mol %, wherein $R_2O$ is the total sum of alkali metal oxides and RO is the total sum of divalent metal oxides.

A twelfth aspect includes a glass composition of any one of the eighth to eleventh aspects, wherein the glass composition comprises from greater than or equal to 0.0 mol % to less than or equal to 15.0 mol % rare earth oxides.

A thirteenth aspect includes a glass composition of any one of the eighth to twelfth aspects, wherein the glass composition comprises: a liquidus viscosity of greater than or equal to 1000 Poises; a Young's modulus of greater than or equal to 86 GPa; a 200 P temperature of less than or equal to 1420° C.; an annealing point of greater than or equal to 660° C.; a specific modulus of greater than or equal to 33 GPa·cm$^3$/gram, and a fracture toughness of greater than or equal to 0.87 MPa·m$^{1/2}$.

A fourteenth aspect includes a glass composition comprising: from greater than or equal to 50.0 mol % to less than or equal to 66.0 mol % $SiO_2$; less than or equal to 20.0 mol % $Al_2O_3$; and from greater than or equal to 6.5 mol % to less than or equal to 12.0 mol % $Li_2O$, wherein the glass composition is essentially free of $ZrO_2$, $TiO_2$, and F, the difference $Al_2O_3-Li_2O-Na_2O-K_2O-RO-P_2O_5$, calculated on molar basis, is greater than or equal to 2.5 mol %, where RO is the total sum of divalent metal oxides, and an amount of $B_2O_3$ does not exceed the amount of $Li_2O$.

A fifteenth aspect includes a glass composition of the fourteenth aspect, wherein the glass composition comprises: a liquidus viscosity of greater than or equal to 1000 Poises; a Young's modulus of greater than or equal to 86 GPa; a 200 P temperature of less than or equal to 1420° C.; an annealing point of greater than or equal to 660° C.; a specific modulus of greater than or equal to 33 GPa·cm$^3$/gram; and a fracture toughness of greater than or equal to 0.87 MPa·m$^{1/2}$.

A sixteenth aspect includes a glass composition of any one of the fourteenth or fifteenth aspects, wherein the glass composition comprises from greater than or equal to 0.0 mol % to less than or equal to 15.0 mol % rare earth oxides.

A seventeenth aspect includes a glass composition of any one of the fourteenth to sixteenth aspects, wherein the glass composition comprises from greater than or equal to 7.0 mol % to less than or equal to 10.0 mol % $Li_2O$.

An eighteenth aspect includes a glass composition comprising: from greater than or equal to 50.0 mol % to less than or equal to 70.0 mol % $SiO_2$; less than or equal to 20.0 mol % $Al_2O_3$; and from greater than or equal to 7.0 mol % to less than or equal to 10 mol % $Li_2O$, wherein the glass composition is essential free of Ti and F, the difference $Al_2O_3-Li_2O-Na_2O-K_2O-RO-P_2O_5$, calculated on molar basis, is greater than or equal to 7.5 mol %, wherein RO is the total sum of divalent metal oxides.

A nineteenth aspect includes a glass composition comprising: from greater than or equal to 50.0 mol % to less than or equal to 70.0 mol % $SiO_2$; from less than or equal to 20.0 mol % $Al_2O_3$; from greater than or equal to 7.0 mol % to less than or equal to 10.0 mol % $Li_2O$; and from greater than or equal to 0.0 mol % to less than or equal to 3.0 mol % $Na_2O$, wherein the glass composition is essentially free of $K_2O$ and $TiO_2$, and the difference $Al_2O_3-Li_2O-Na_2O-RO$, calculated on molar basis, is greater than or equal to 7.5 mol %, wherein RO is the total sum of divalent metal oxides.

A twentieth aspect includes a glass composition comprising: from greater than or equal to 50.0 mol % to less than or equal to 65.0 mol % $SiO_2$; from greater than or equal to 10.0 mol % to less than or equal to 20.0 mol % $Al_2O_3$; less than or equal to 10.0 mol % $Li_2O+Na_2O+K_2O$; greater than or equal to 7.0 mol % $Li_2O$; from greater than or equal to 0.0 mol % to less than or equal to 8.0 mol % $B_2O_3$; from greater than or equal to 0.0 mol % to less than or equal to 5.0 mol % $P_2O_5$; from greater than or equal to 1.0 mol % to less than or equal to 10.0 mol % MgO+CaO+ZnO; from greater than or equal to 0.0 mol % to less than 1.0 mol % MgO; from greater than or equal to 0.1 mol % to less than or equal to 15.0 mol % of oxides of rare earth metals; and less than or equal to 1.0 mol % of other species.

A twenty first aspect includes a glass composition comprising: from greater than or equal to 30.0 wt % to less than or equal to 55.0 wt % $SiO_2$; from greater than or equal to 16.0 wt % to less than or equal to 25.0 wt % $Al_2O_3$; from greater than or equal to 2.5 wt % to less than or equal to 7.0 wt % $Li_2O+Na_2O+K_2O$; greater than or equal to 2.5 wt % $Li_2O$; from greater than or equal to 0.5 wt % to less than or equal to 1.5 wt % MgO+CaO+ZnO; from greater than or equal to 1.0 wt % to less than or equal to 45.0 wt % of oxides of rare earth metals; from greater than or equal to 0.0 wt % to less than or equal to 10.0 wt % $B_2O_3$; from greater than or equal to 0.0 wt % to less than or equal to 5.0 wt % $P_2O_5$; and less than or equal to 1.0 wt % of other species.

A twenty second aspect includes a glass composition of any one of the eighteenth to twentieth aspects, wherein $Al_2O_3$ (mol %) is greater than or equal to $Li_2O+Na_2O+K_2O+ZnO+MgO+CaO+P_2O_5+3.0$ mol %, and the glass composition has a liquidus viscosity of greater than or equal to 10,000 Poises.

A twenty third aspect includes a glass composition of any one of the eighteenth to twenty third aspects, wherein the glass composition has a liquidus viscosity greater than or equal to 50,000 Poises.

A twenty fourth aspect includes a glass composition of any one of the eighteenth to twenty third aspects, wherein the glass composition has a fracture toughness of greater than or equal to 0.9 MPa·m½.

A twenty firth aspect includes a glass composition of any one of the eighteenth to twenty fourth aspects, wherein the glass composition has a Young's modulus from greater than or equal to 90 GPa to less than or equal to 100 GPa.

A twenty sixth aspect includes a glass composition of any one of the eighteenth to twenty fifth aspects, wherein the glass composition has a specific modulus of greater than or equal to 31 GPa·cm$^3$/gram.

A twenty seventh aspect includes a glass composition of any one of the eighteenth to twenty first aspects, wherein the glass composition comprises: a 200 P temperature of less than or equal to 1450° C.; an annealing point of greater than or equal to 630° C.; a Young's modulus of greater than or equal to 80 GPa; a fracture toughness of greater than or than or equal to 0.8 MPa·m$^{1/2}$; and a specific modulus of at greater than or equal to 31.0 GPa·cm$^3$/gram.

A twenty eighth aspect includes a glass composition of any one of the eighteenth to twenty first aspects, wherein the glass composition comprises: a 200 P temperature of less than or equal to 1300° C.; an annealing point of greater than or equal to 650° C.; a Young's modulus of greater than or equal to 100 GPa; and a fracture toughness less than or equal to 0.83 MPa·m$^{1/2}$.

A twenty ninth aspect includes a glass composition of any one of the eighteenth to twenty first aspects, wherein the content of $SiO_2$ is greater than or equal to 60.0 mol %.

A thirtieth aspect includes a glass composition of any one of the eighteenth to twenty first aspects, wherein the glass composition has a specific modulus of greater than or equal to 30.0 GPa·cm3/gram.

A thirty first aspect includes a glass composition of any one of the eighteenth to twenty first aspects, wherein the glass composition has a fracture toughness of greater than or equal to 0.8 MPa·m½.

A thirty second aspect includes a glass composition comprising: from greater than or equal to 57.0 mol % to less than or equal to 64.0 mol % $SiO_2$; from greater than or equal to 14.0 mol % to less than or equal to 20.0 mol % $Al_2O_3$; less than or equal to 10.0 mol % $Li_2O+Na_2O+K_2O$; greater than or equal to 7.5 mol % $Li_2O$; from greater than or equal to 5.0 mol % to less than or equal to 8.0 mol % $B_2O_3$; from greater than or equal to 1.0 mol % to less than or equal to 2.5 mol % MgO+CaO+ZnO; from greater than or equal to 3.0 mol % to less than or equal to 7.0 mol % rare earth metal oxides; and from greater than or equal to 0.0 mol % to less than or equal to 1.0 mol % $P_2O_5$.

A thirty third aspect includes a glass composition of the thirty second aspect, wherein the glass composition comprises: a 200 P temperature of less than or equal to 1450° C.; an annealing point of greater than or equal to 600° C.; a fracture toughness greater than or equal to 0.8 MPa·m$^{1/2}$; a Young's modulus greater than or equal to 80 GPa; and a specific modulus of greater than or equal to 30.0 GPa·cm$^3$/gram.

A thirty fourth aspect includes a glass composition of the thirty second aspect, wherein the glass composition comprises: a 200 P temperature from greater than or equal to 1400° C. to less than or equal to 1650° C.; an annealing point greater than or equal to 600° C.; a fracture toughness greater than or equal to 0.8 MPa·m$^{1/2}$; a Young's modulus of greater than or equal to 80 GPa; and a specific modulus of greater than or equal to 30.0 GPa·cm$^3$/gram.

A thirty fifth aspect includes a glass composition of any one of the thirty second to thirty fourth aspects, wherein the glass composition has a liquidus viscosity greater than or equal to 20,000 Poises.

A thirty sixth aspect includes a glass composition of any one of the thirty second to thirty fourth aspects, wherein the glass composition has a liquidus viscosity greater than or equal to about 80,000 Poises.

A thirty seventh aspect includes a glass composition consisting essentially of: from greater than or equal to 60.1 mol % to less than or equal to 70.0 mol % $SiO_2$; from greater than or equal to 12.0 mol % to less than or equal to 20.0 mol % $Al_2O_3$; from greater than or equal to 7.0 mol % to less than or equal to 9.9 mol % $Li_2O+Na_2O+K_2O$; from greater than or equal to 7.0 mol % to less than or equal to 9.9 mol % $Li_2O$; from greater than or equal to 0.0 mol % to less than or equal to 2.9 mol % $Na_2O$; from greater than or equal to 0.0 mol % to about less than or equal to 1.0 mol % $K_2O$; from greater than or equal to 3.0 mol % to less than or equal to 8.0 mol % $B_2O_3$; from greater than or equal to 0.0 mol % to less than or equal to 2.0 mol % MgO+CaO+SrO+BaO+ZnO; from greater than or equal to 0.0 mol % to less than or equal to 3.0 mol % rare earth metal oxides; and from greater than or equal to 0.0 mol % to less than or equal to 1.0 mol % $P_2O_5$.

A thirty eighth aspect includes a glass composition of the thirty seventh aspect, wherein the glass composition has a 200 P temperature of less than or equal to 1600° C., and an annealing point of greater than or equal to 600° C., a fracture toughness of greater than or equal to 0.8 MPa·m$^{1/2}$, a Young's modulus of greater than or equal to 80 GPa, and a specific modulus of greater than or equal to 32.0 GPa cm$^3$/gram.

A thirty ninth aspect includes a glass composition of any one of the thirty seventh or thirty eight aspects, wherein the glass composition has a liquidus viscosity greater than or equal to 20,000 Poises.

A fortieth aspect includes a glass composition of any one thirty seventh or thirty eighth aspects, wherein the glass composition has a liquidus viscosity greater than or equal to 150,000 Poises.

A forty first aspect includes a glass composition of any one of the thirty seventh to fortieth aspects, wherein the glass composition comprises greater than or equal to about 13.0 mol % $Al_2O_3$.

A forty second aspect includes a glass composition comprising: $SiO_2$; $Al_2O_3$; and $Li_2O$, wherein the glass composition comprises greater than or equal to 6.5 mol % $Li_2O$, the difference $Al_2O_3-R_2O$, calculated on molar basis, is greater than or equal to 4.5 mol %, wherein $R_2O$ is the total content of $Li_2O$, $Na_2O$, and $K_2O$ in mol %, the glass composition comprises: a liquidus viscosity of greater than or equal to 1000 Poises; 200 P temperature of less than or equal to 1550° C.; and an annealing point greater than or equal to 600° C.

A forty third aspect includes a glass composition of the forty second aspect, wherein the difference $Al_2O_3-R_2O-RO$, calculated on molar basis, is greater than or equal to 4.5 mol %, wherein $R_2O$ is the total content of $Li_2O$, $Na_2O$, and $K_2O$ in mol %, and RO is the total sum of divalent metal oxides.

A forty fourth aspect includes a glass composition of any one of forty second or forty third aspects, wherein the glass composition has a difference $Al_2O_3-R_2O$, calculated on molar basis, that is greater than or equal to 5.0 mol %.

A forty fifth aspect includes a glass composition of any one of the forty second to forty fourth aspects, wherein the glass composition has a 200 P temperature of less than or equal to 1450° C.

A forty sixth aspect includes a glass composition of any one of the forty second to forty fifth aspects, wherein the glass composition has an annealing point of greater than or equal to 660° C.

A forty seventh aspect includes a glass composition of the forty second aspect, wherein the difference $Al_2O_3-R_2O-RO-P_2O_5$, calculated on molar basis, is greater than or equal to 2.5 mol %, where $R_2O$ is the total sum of alkali metal oxides and RO is the total sum of divalent metal oxides.

A forty eighth aspect includes a glass composition of any one of forty second to forty eighth aspects, wherein the glass composition has a liquidus viscosity of greater than or equal to 10,000 Poises.

A forty ninth aspect includes a glass composition of any one of the forty second to forty eighth aspects, wherein the glass composition comprises: a Young's modulus of greater than or equal to 92 GPa; a specific modulus of greater than or equal to 33.9 GPa·cm$^3$/gram; and a fracture toughness of greater than or equal to 0.9 MPa·m$^{1/2}$.

A fiftieth aspect includes a glass composition comprising: $SiO_2$; $Al_2O_3$; and $Li_2O$, wherein $SiO_2$ (mol %) is greater than or equal to $4.0*Li_2O+6.0*(Na_2O+K_2O)+2.0*(CaO+SrO+BaO)+2.5*MgO+0.5*Al_2O_3-1.0$, $Li_2O \geq 6.0$ mol %, $Li_2O+Na_2O+K_2O$ is less than or equal to 14.0 mol %, and the glass composition comprises: a liquidus viscosity of greater than or equal to 1000 Poises; a 200 P temperature less than or equal to 1550° C.; and an annealing point greater than or equal to 600° C.

A fifty first aspect includes a glass composition of the fiftieth aspect, wherein the glass composition has a liquidus viscosity greater than or equal to 10,000 Poises.

A fifty second aspect includes a glass composition of any one of the fiftieth or fifty first aspects, wherein the glass composition has a Young's modulus of greater than or equal to 85 GPa.

A fifty third aspect includes a glass composition of any one of the fiftieth to fifty second aspects, wherein the glass composition has a fracture toughness of greater than or equal to 0.8 MPa·m$^{1/2}$.

A fifty fourth aspect includes a glass composition of any one of the fiftieth to fifty third aspects, wherein the glass composition comprises greater than or equal to 7.0 mol % $Li_2O$.

A fifty fifth aspect includes a glass composition of any one of the fiftieth to fifty fourth aspects, wherein the glass composition comprises less than or equal to 10.0 mol % $Li_2O+Na_2O+K_2O$.

A fifty sixth aspect includes a glass composition of any one of the fiftieth to fifty fifth aspects, wherein the glass composition has an annealing point greater than or equal to 630° C.

A fifty seventh aspect includes a glass composition comprising: from greater than or equal to 68.0 mol % to less than or equal to 80.0 mol % $SiO_2$; from greater than or equal to 6.7 mol % to less than or equal to 12.5 mol % $Li_2O+Na_2O+K_2O$; greater than or equal to 6.7 mol % $Li_2O$; less than or equal to 1.5 mol % $ZrO_2+TiO_2$; and a molar ratio $Al_2O_3$ (mol %)–$\Sigma R_2O$ (mol %)–$\Sigma RO$ (mol %) is greater than or equal to 0.0 mol %, wherein the glass composition comprises: a liquidus temperature that is less than or equal to 1260° C., and $R_2O$ is a sum of all monovalent oxides in mol %, and RO is a sum of all divalent oxides in mol %.

A fifty eighth aspect includes a glass composition of the fifty seventh aspect, wherein the glass composition comprises greater than or equal to 70.0 mol % to less than or equal to 75.0 mol % $SiO_2$.

A fifty ninth aspect includes a glass composition of any one of the fifty seventh or fifty eighth aspects, wherein the glass composition comprises less than 10.0 mol % $Li_2O$.

A sixtieth aspect includes a glass composition of any one of the fifty seventh to fifty ninth aspects, wherein the glass composition is essentially free of $K_2O$, $TiO_2$, $ZrO_2$ and F.

A sixty first aspect includes a glass composition of any one of the fifty seventh to sixtieth aspects, wherein the glass composition further comprises greater than or equal to 0.0 mol % to less than or equal to 2.0 mol % of divalent metal oxides.

A sixty second aspect includes a glass composition of any one of the fifty seventh to sixty first aspects, wherein the glass composition further comprises greater than or equal to 0.0 mol % to less than or equal to 8.0 mol % $B_2O_3$.

A sixty third aspect includes a glass composition of any one of the fifty seventh to sixty second aspects, wherein the glass composition further comprises greater than or equal to 0.0 mol % to less than or equal to 8.0 mol % $P_2O_5$.

A sixty fourth aspect includes a glass composition of any one of the fifty seventh to sixty third aspects, wherein the glass composition has a liquidus viscosity greater than or equal to 10,000 Poises.

A sixty fifth aspect includes a glass composition of any one of the fifty seventh to sixty third aspects, wherein the glass composition has a liquidus viscosity greater than or equal to 300,000 Poises.

A sixty sixth aspect includes a consumer electronic product, comprising: a housing having a front surface, a back surface and side surfaces; electrical components provided at least partially within the housing, the electrical components including at least a controller, a memory, and a display, the display being provided at or adjacent the front surface of the housing; and a cover substrate disposed over the display, wherein at least one of a portion of the housing or the cover substrate comprises the glass article comprising a glass composition of any one of the preceding claims.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
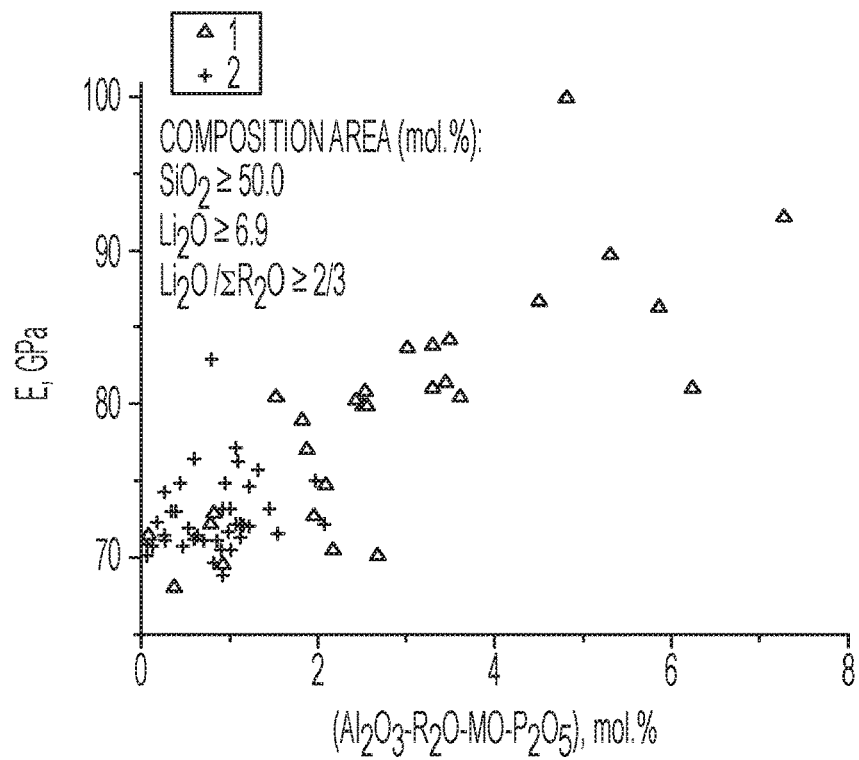
FIG. 1 is a graph showing Young's modulus (E) versus glass composition for comparative glass compositions and glass compositions according to embodiments disclosed and described herein.

Reference will now be made in detail to alkali aluminosilicate glasses according to various embodiments. Alkali aluminosilicate glasses have good ion exchangeability, and chemical strengthening processes have been used to achieve high strength and high toughness properties in alkali aluminosilicate glasses. Lithium aluminosilicate glasses are highly ion exchangeable glasses. The substitution of $Al_2O_3$ into the silicate glass network increases the interdiffusivity of monovalent cations during ion exchange. By chemical strengthening in a molten salt bath (e.g., $KNO_3$ or $NaNO_3$), glasses with high strength, high toughness, and high indentation cracking resistance can be achieved.

Chemical strengthening, such as ion exchange strengthening, results in a compression stress layer in in the glass article, as described above. To increase this compressive stress, relaxation of stress in the glass should be minimized. Glass compositions having a high annealing point and a high strain point can minimize relaxation and, thereby, increase the compressive stress of the glass article. High annealing and strain points may be achieved by forming a glass with high viscosity at low temperatures.

To improve other mechanical properties, such as Young's modulus and fracture toughness, components such as alumina ($Al_2O_3$) may be added to the glass composition. Also, to form the glass articles using conventional forming methods, the 200 Poise temperature of the glass composition should be relatively low. In addition, a low liquidus temperature may be needed to keep the glass composition from crystallizing when formed into a ribbon or article. It is difficult to formulate a glass composition that achieves all of these performance characteristics and that can be easily and effectively strengthened by ion exchange processes. For example, attempts to reduce the 200 Poise temperature can also reduce the annealing and strain points and liquidus viscosity of the glass composition. Likewise, attempts to add more lithium to a glass composition—which can improve the effectiveness of the ion exchange process—can result in raising the liquidus temperature, and adding too much alumina to improve mechanical properties can result in higher liquidus and melting temperatures.

Accordingly, embodiments of glass compositions and articles provided in this specification provide glass compositions that have relatively high lithium content and low content of other alkali metals. These glass compositions can be melted at relatively low temperatures that are compatible with conventional refractories, are stable at high temperatures—as shown by high strain and annealing points, have desirable mechanical properties, and have a relatively high liquidus viscosity.

As used herein: the term "softening point" refers to the temperature at which the viscosity of the glass composition is $10^{7.6}$ poise; the term "annealing point" refers to the temperature determined according to ASTM C598-93, at which the viscosity of a glass of a given glass composition is approximately $10^{13.2}$ poise; the terms "strain point" and "Tstrain" refer to the temperature determined according to ASTM C598-93, at which the viscosity of a glass at a given glass composition is approximately $10^{14.7}$ poise; the term "liquidus temperature" refers to the temperature above which the glass composition is completely liquid with no crystallization of constituent components of the glass; the term "liquidus viscosity" refers to the viscosity of the glass composition at the liquidus temperature of the glass composition; the term "coefficient of thermal expansion" or "CTE" refers to the coefficient of linear thermal expansion of the glass composition over a temperature range from room temperature (RT) to 300° C.

The term "glass-former" means a substance that, being presented in the melt solely (without additives), is able to form a glass when cooling with conventional rate, e.g. by using a conventional glass-making procedure, such as cooling in air, casting on a metal plate, up- or down-draw process, etc. The most commonly used glass-forming oxides are $SiO_2$, $B_2O_3$, $P_2O_5$ and $GeO_2$. There are some other species (e.g., $TeO_2$, PbO, etc.), which can be presented in glasses in large enough amounts (sometimes up to 95 mol % or even more), but do not form glasses without additives. These species are not considered as glass-formers. Also, there are some species (e.g., $Al_2O_3$), which can be incorporated into a glass structure, playing a role similar to glass-formers, but also unable to form glasses solely; these species are also not considered glass-formers.

The terms "free" and "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.05 mol %.

The term "tramp," when used to describe a particular constituent component in a glass composition, refers to a constituent component that is not intentionally added to the glass composition and is present in amounts less than 0.05 mol %. Tramp components may be unintentionally added to the glass composition as an impurity in another constituent component or through migration of the tramp component into the composition during processing of the glass composition.

In embodiments of glass compositions described herein, the concentration of constituent components (e.g., $SiO_2$, $Al_2O_3$, $Li_2O$, and the like) are given in mole percent (mol %) on an oxide basis, unless otherwise specified. Components of the alkali aluminosilicate glass composition according to embodiments are discussed individually below. It should be understood that any of the variously recited ranges of one component may be individually combined with any of the variously recited ranges for any other component.

Embodiments of glass compositions disclosed and described herein comprise lithium in amounts from greater than or equal to 7.0 mol % to 10.0 mol % and low amounts of other alkali metals such that the total amount of alkali metals—including lithium—is less than or equal to 10.0 mol %, unless otherwise specified. Embodiments of glass compositions disclosed and described herein also include high amounts of $Al_2O_3$, such as greater than or equal to 14.0 mol % so that there is more $Al_2O_3$ in the glass composition than other modifying oxides, including alkali metal oxides and alkaline earth metal oxides. In some embodiments, the glass compositions may comprise an excess of $Al_2O_3$ in comparison to other modifying oxides and phosphorous oxide ($P_2O_5$). In some embodiments, the glass composition may comprise $P_2O_5$ as a glass forming component such that $Al_2O_3$ is in excess of other modifying oxides not including $P_2O_5$.

According to embodiments, the main glass-forming component is silica ($SiO_2$), which is the largest constituent of the composition and, as such, is the primary constituent of the resulting glass network. Without being bound to theory, $SiO_2$ enhances the chemical durability of the glass and, in particular, the resistance of the glass composition to decomposition in acid and the resistance of the glass composition to decomposition in water. If the content of $SiO_2$ is too low, the chemical durability and chemical resistance of the glass may be reduced and the glass may be susceptible to corrosion. Accordingly, a high $SiO_2$ concentration is generally desired in embodiments. However, if the content of $SiO_2$ is too high, the formability of the glass may be diminished as higher concentrations of $SiO_2$ may increase the difficulty of melting the glass which, in turn, adversely impacts the formability of the glass. In the embodiments described herein, the glass composition generally comprises $SiO_2$ in an amount from greater than or equal to 50.0 mol % to less than or equal to about 80.0 mol %, or from greater than or equal to 50.0 mol % to less than or equal to 65.0 mol %, and all ranges and sub-ranges between the foregoing values. In some embodiments, the glass composition comprises $SiO_2$ in amounts greater than or equal to 52.0 mol %, greater than or equal to 54.0 mol %, greater than or equal to 56.0 mol %, greater than or equal to 58.0 mol %, greater than or equal to 60.0 mol %, greater than or equal to 62.0 mol %, or greater than or equal to 64.0 mol %. In embodiments, the glass composition comprises $SiO_2$ in amounts less than or equal to 64.0 mol %, less than or equal to 62.0 mol %, less than or equal to 60.0 mol %, less than or equal to 58.0 mol %, less than or equal to 56.0 mol %, less than or equal to 54.0 mol %, or less than or equal to 52.0 mol %. It should be understood that, in embodiments, any of the above ranges may be combined with any other range. However, in some embodiments, the glass composition comprises $SiO_2$ in an amount from greater than or equal to 52.0 mol % to less than or equal to 64.0 mol %, from greater than or equal to 54.0 mol % to less than or equal to 62.0 mol %, or from greater than or equal to 56.0 mol % to less than or equal to 60.0 mol % and all ranges and sub-ranges between the foregoing values.

In embodiments, the glass composition comprises lithium oxide, $Li_2O$. Without being bound by theory, adding this component to a glass composition makes a glass suitable to high-performance ion exchange of lithium ion ($Li^+$) for a larger alkali metal ion, such as sodium ion ($Na^+$), for example, in order to make a compressed ion-exchanged layer near to the glass surface that increases the strength of a glass article to bending and tension. According to embodiments, the glass composition comprises greater than or equal to 4.0 mol % $Li_2O$, and in some embodiments, greater than or equal to about 7.0 mol % $Li_2O$. The more $Li_2O$ in a glass composition, the higher compressive stress is generated in the surface layer, and the greater the strength of the resulting glass article is. However, the compressive stress in the exchanged layer should be compensated by the tensile stress in the central part of the article. Generally, the higher the compressive stress at the surface and the deeper the exchanged layer, the greater the central tension in the glass. However, if the $Li_2O$ content greatly exceeds about 10 mole %, the liquidus temperature tends to increase while the viscosity decreases creating a rapid drop in liquidus viscosity. Thus, it is desirable to keep the $Li_2O$ content less than or equal to about 10.0 mol % for forming and manufacturing. In embodiments, the glass composition generally comprises $Li_2O$ in an amount from greater than or equal to 6.7 mol % to less than or equal to 10.0 mol % and all ranges and sub-ranges between the foregoing values. In some embodiments, the glass composition comprises $Li_2O$ in amounts greater than or equal to 7.0 mol %, greater than or equal to 7.2 mol %, greater than or equal to 7.4 mol %, greater than or equal to 7.6 mol %, greater than or equal to 7.8 mol %, greater than or equal to 8.0 mol %, greater than or equal to 8.2 mol %, greater than or equal to 8.4 mol %, greater than or equal to 8.6 mol %, greater than or equal to 8.8 mol %, greater than or equal to 9.0 mol %, greater than or equal to 9.2 mol %, greater than or equal to 9.4 mol %, greater than or equal to 9.6 mol %, or greater than or equal to 9.8 mol %. In some embodiments, the glass composition comprises $Li_2O$ in amounts less than or equal to 9.8 mol %, less than or equal to 9.6 mol %, less than or equal to 9.4 mol %, less than or equal to 9.2 mol %, less than or equal to 9.0 mol %, less than or equal to 8.8 mol %, less than or equal to 8.6 mol %, less than or equal to 8.4 mol %, less than or equal to 8.2 mol %, less than or equal to 8.0 mol %, less than or equal to 7.8 mol %, less than or equal to 7.6 mol %, less than or equal to 7.4 mol %, or less than or equal to 7.2 mol %. It should be understood that, in embodiments, any of the above ranges may be combined with any other range. However, in some embodiments, the glass composition comprises $Li_2O$ in an amount from greater than or equal to 7.2 mol % to less than or equal to 9.8 mol %, such as from greater than or equal to 7.4 mol % to less than or equal to 9.6 mol %, from greater than or equal to 7.6 mol % to less than or equal to 9.4 mol %, from greater than or equal to 7.8 mol % to less than or equal to 9.2 mol %, from greater than or equal to 8.0 mol % to less than or equal to 9.0 mol %, from greater than or equal to 8.2 mol % to less than or equal to 8.8 mol %, or from greater than or equal to 8.4 mol % to less than or equal to 8.6 mol %, and all ranges and sub-ranges between the foregoing values.

The glass compositions according to embodiments, include alumina ($Al_2O_3$). $Al_2O_3$, in conjunction with alkali metal oxides present in the glass compositions such as $Li_2O$, or the like, improves the susceptibility of the glass to ion exchange strengthening. More specifically, increasing the amount of $Al_2O_3$ in the glass compositions increases the speed of ion exchange in the glass and increases the compressive stress produced in the compressive layer of the glass as a result of ion exchange. Without being bound to theory, alkali metal oxides compensated with $Al_2O_3$ exhibit greater mobility during ion exchange compared to alkali oxides that are not compensated with $Al_2O_3$. The $Al_2O_3$ may also increase the hardness and damage resistance of the glass, especially if its content in glass (in mole percent) exceeds the total content of alkali metal oxides (also in mole percent). Also, the $Al_2O_3$ may increase the annealing and strain points of a glass, which make the glass more durable to high temperatures. However, addition of $Al_2O_3$ to a glass composition usually increases the liquidus temperature due to formation of various refractory species, such as, for example, spodumene, corundum, mullite, etc. This may lead to decreasing the liquidus viscosity and, therefore, may cause the glass composition to crystallize during production, for example, during a fusion downdraw process. Accordingly, glass compositions of embodiments comprise $Al_2O_3$ in an amount that exceeds the total content of alkali metal oxides, but does not decrease the liquidus viscosity too much. According to embodiments, this corresponds to the concentration of $Al_2O_3$ from greater than or equal to 10.0 mol % to less than or equal to 25.0 mol %, and all ranges and sub-ranges between the foregoing values. In some embodiments, the glass composition comprises $Al_2O_3$ in amounts greater than or equal to 14.5 mol %, greater than or equal to 15.0 mol %, greater than or equal to 15.5 mol %, greater than or equal to 16.0 mol %, greater than or equal to 16.5 mol %, greater than or equal to 17.0 mol %, greater than or equal to 17.5 mol %, greater than or equal to 18.0 mol %, greater than or equal to 18.5 mol %, greater than or equal to 19.0 mol %, or greater than or equal to 19.5 mol %. In embodiments, the glass composition comprises $Al_2O_3$ in amounts less than or equal to 19.5 mol %, less than or equal to 19.0 mol %, less than or equal to 18.5 mol %, less than or equal to 18.0 mol %, less than or equal to 17.5 mol %, less than or equal to 17.0 mol %, less than or equal to 16.5 mol %, less than or equal to 16.0 mol %, less than or equal to 15.5 mol %, less than or equal to 15.0 mol %, or less than or equal to 14.5 mol %. It should be understood that, in embodiments, any of the above ranges may be combined with any other range. However, in some embodiments, the glass composition comprises $Al_2O_3$ in an amount from greater than or equal to 14.5 mol % to less than or equal to 19.5 mol %, such as from greater than or equal to 15.0 mol % to less than or equal to 19.0 mol %, greater than or equal to 15.5 mol % to less than or equal to 18.5 mol %, greater than or equal to 16.0 mol % to less than or equal to 18.0 mol %, or greater than or equal to 16.5 mol % to less than or equal to 17.5 mol %, and all ranges and sub-ranges between the foregoing values.

Glass compositions according to embodiments may also comprise alkali metal oxides (also referred to herein as "alkalis" and the abbreviation "$R_2O$"), other than $Li_2O$ (e.g., $Na_2O$, $K_2O$, $Rb_2O$ and $Cs_2O$).

According to embodiments, glass compositions comprise sodium oxide ($Na_2O$). The amount of $Na_2O$ in the glass compositions also relates to the ion exchangeability of the glass made from the glass compositions. Specifically, the presence of $Na_2O$ in the glass compositions may increase the ion exchange rate during ion exchange strengthening of the glass by increasing the diffusivity of Na+ ions through the glass matrix. Also, $Na_2O$ may suppress the crystallization of alumina containing species, such as spodumene, mullite and corundum and, therefore, decrease the liquidus temperature and increase the liquidus viscosity. However, without being bound to theory, as the amount of $Na_2O$ present in the glass compositions increases, the compressive stress obtainable in the glass through ion exchange decreases. For example, ion exchange of a sodium ion with another sodium ion of the same size results in no net increase in the compressive stress in the compressive layer, but extra $Na_2O$ softens the glass and speeds up stress relaxation. Thus, increasing the $Na_2O$ amount in the glass compositions often decreases the compressive stress created in the glass by the ion exchange. Also, $Na_2O$ may worsen the mechanical properties of glass since it decreases the elastic modulus and the fracture toughness, and/or decrease the annealing and strain points of glass. Accordingly, it is desirable in embodiments to limit the amount of $Na_2O$ present in the glass compositions. In some embodiments, the amount of $Na_2O$ is greater than or equal to 0.0 mol % and less than or equal to 4.0 mol %. In some other embodiments, the content of $Na_2O$ is less than or equal to 3.0 mol %. Accordingly, it should be understood that in embodiments, $Na_2O$ need not be present in the glass composition. However, when $Na_2O$ is included in the glass compositions, the amount of $Na_2O$ in the glass composition is from greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, or greater than or equal to 3.5 mol In embodiments, the glass composition comprises $Na_2O$ in amounts less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range. However, in some embodiments, the glass composition comprises $Na_2O$ in an amount from greater than or equal to 0.5 mol % to less than or equal to 3.5 mol %, such as from greater than or equal to 1.0 mol % to less than or equal to 3.0 mol %, or greater than or equal to 1.5 mol % to less than or equal to 2.5 mol %, and all ranges and sub-ranges between the foregoing values.

The glass compositions, according to embodiments may further include $K_2O$. The amount of $K_2O$ present in the glass compositions also relates to the ion exchangeability of the glass composition. Specifically, as the amount of $K_2O$ present in the glass composition increases, the compressive stress in the glass obtainable through ion exchange decreases as a result of the exchange of potassium and sodium ions. Also, the potassium oxide, like the sodium oxide, may decrease the liquidus temperature and increase the liquidus viscosity, but at the same time decrease the elastic modulus and fracture toughness and/or decrease the annealing and strain points. Accordingly, it is desirable to limit the amount of $K_2O$ present in the glass compositions. Accordingly, glass compositions of some embodiments do not comprise $K_2O$. However, some embodiments of glass compositions comprise less than or equal to 0.5 mol % $K_2O$.

Other alkalis, such as $Rb_2O$ and $Cs_2O$, may also be presented in the glass compositions, according to some embodiments. These alkalis effect the glass composition in the same way as $K_2O$ discussed above. However, these components generate undesirable effects, such as increasing the density, reducing the elastic moduli and fracture toughness, decreasing the compressive stress in an exchanged layer, etc., at lower concentrations than $K_2O$. Therefore, glass compositions of some embodiments do not comprise these alkalis. However, some embodiments of glass compositions may comprise less than 0.5 mol % of these alkalis.

As disclosed above, the excess of alumina compared to alkalis (i.e., the difference $Al_2O_3-R_2O$ in mole percent, is numerical measure of the amount of unbounded (non-compensated) alkalis. To improve the ion exchange performance and mechanical properties according to embodiments, this difference should be positive (i.e., the glass composition should comprise more alumina than alkalis). However, when this difference gets too high, the liquidus temperature and ion exchange performance drops. Accordingly, in embodiments, the difference of alumina to alkalis (i.e., $Al_2O_3-R_2O$) is less than or equal to 20.0 mol %, less than or equal to 15.0 mol %, less than or equal to 10.0 mol %, or less than or equal to 5.0 mol %. In embodiments, the difference of alumina to alkalis is greater than or equal to 5.0 mol %, greater than or equal to 10.0 mol %, or greater than or equal to 15.0 mol %. It should be understood that, in embodiments, any of the above ranges may be combined with any other range. However, in some embodiments, the difference of alumina to alkalis is from greater than or equal to 5.0 mol % to less than or equal to 20.0 mol %, such as from greater than or equal to 10.0 mol % to less than or equal to 15.0 mol, and all ranges and sub-ranges between the foregoing values.

Alkaline earth oxides, i.e. BeO, MgO, CaO, SrO, BaO or combination thereof (also referred to herein as "alkaline earths" or "RO"), as well as other divalent metal oxides, e.g. ZnO, NiO, MnO, etc. may present in embodiments of the glass compositions to improve the meltability of the glass batch materials and increase the chemical durability of the resultant glass. In particular, without being bound by theory, the presence of small amounts of alkaline earth oxides may work to increase the liquidus viscosity of the glass composition. However, too much content of alkaline earths in a glass composition may cause crystallization of aluminosilicates and, therefore, reduce the liquidus viscosity of the glass compositions. The presence of alkaline earths may also impact the ion exchange performance of the resultant glass. For example, in the glass compositions described herein, the total amount of alkaline earth oxides (i.e., RO (mol %)) present in the glass compositions is generally less than the total amount in mol % of alkali oxides present in the glass compositions which improves the ion exchangeability of the glass. In embodiments, the glass compositions generally include from greater than or equal to 0.0 mol % to less than or equal to 5.0 mol % alkaline earth oxides, and all ranges and sub-ranges between the foregoing values.

In some embodiments, the alkaline earth oxides may include MgO in amounts less than or equal to 5.0 mol %. Without being bound by theory, at an excess of $Al_2O_3$, MgO may cause crystallization of spinel at high temperatures, which increases the liquidus temperature and decreases the liquidus viscosity of a glass composition. Therefore, in such embodiments, the content of MgO should be limited. Accordingly, in some embodiments, the glass compositions may include MgO in amounts from greater than or equal to about 0.0 mol % and less than or equal to about 2.0 mol %, or less than or equal to about 1.0 mol %, and all ranges and sub-ranges between the foregoing values. Accordingly, it should be understood that MgO needs not be present in glass compositions of some embodiments.

In some embodiments, the alkaline earth oxides may optionally include CaO in an amount from greater than or equal to 0.0 mol % to less than or equal to 4.0 mol %, such as greater than or equal to 0.5 mol % to less than or equal to 3.5 mol %, greater than or equal to 1.0 mol % to less than or equal to 3.0 mol %, or greater than or equal to 1.5 mol % to less than or equal to 2.5 mol %, and all ranges and sub-ranges between the foregoing values. Without being bound to theory, the presence of CaO may increase the liquidus viscosity of the glass compositions. However, too much CaO in a glass composition may decrease the rate of ion exchange in the resultant glass. Accordingly, it should be understood that CaO need not be present in the glass compositions according to some embodiments.

Further, according to embodiments, the alkaline earth oxides may optionally include SrO and/or BaO. These provide glass properties similar to CaO, but may have an undesirable effect of increasing the density of glass. Accordingly, if these alkaline earth oxides are included in glass compositions of embodiments, their total content should be less than or equal to 5.0 mol %, such as less than or equal to 4.0 mol %, less than or equal to 3.0 mol %, less than or equal to 2.0 mol %, less than or equal to 1.0 mol %, or less than or equal to 0.5 mol %. It should be understood that SrO and/or BaO need not be present in the glass compositions according to some embodiments.

Glass compositions, according to embodiments, may contain a small amount of zinc oxide, ZnO. Zinc oxide may partially compensate the excess of $Al_2O_3$, which leads to some suppression of crystallization of mullite and, therefore, reduces the liquidus temperature and increases the liquidus viscosity. Also, zinc, contrary to magnesium and other species, does not form refractory aluminosilicates. However, at an excess of $Al_2O_3$, zinc oxide, solely or together with the magnesium oxide, may form spinel that may crystallize at high temperatures and, therefore, in this case ZnO may increase the liquidus temperature and reduce the liquidus viscosity. Accordingly, it should be understood that ZnO need not be present in the glass compositions of some embodiments. However, when ZnO is included in embodiments of the glass compositions with excess of alumina, the amount of ZnO in the glass compositions is generally less than or equal to 3.0 mol %, less than or equal to 2.0 mol %, less than or equal to 1.0 mol %, or less than or equal to 0.5 mol %.

Alkali and alkaline earth metal oxides, together with other divalent metal oxides, play a role of modifiers in the structure of aluminosilicate glasses. Without being bound to theory, they react with alumina, which leads to removing some or all non-bridging oxygen atoms. However, being bounded with the modifiers in the glass structure, alumina loses the ability to significantly improve the mechanical properties, such as elastic moduli and fracture toughness. These effects may appear only in the case when a glass composition comprises some excess of alumina over all modifying oxides, which means that the difference $Al_2O_3$–$R_2O$–RO (in mole percent) is positive. Accordingly, this difference can be used as an approximate numerical characteristic of the contribution of modifying oxides and alumina to the above-mentioned mechanical properties of a glass composition. Generally, the greater the difference $Al_2O_3$–$R_2O$–RO, the better the mechanical properties are.

It is also known that at a low content of $SiO_2$, such as less than or equal to 60.0 mol %, and high content of $Al_2O_3$ in a glass composition, it may crystallize at high temperatures (such as greater than 1200° C., greater than 1300° C., and even greater than 1400° C.), precipitating the corundum as a primary crystalline phase. Therefore, some precaution may be taken to prevent this effect. After some experimental study, it was found that the following rule that prevents corundum from high-temperature crystallization:

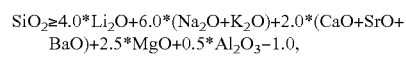
$$SiO_2 \geq 4.0*Li_2O+6.0*(Na_2O+K_2O)+2.0*(CaO+SrO+BaO)+2.5*MgO+0.5*Al_2O_3-1.0,$$

where chemical formulas of oxides mean their mole percent in a glass composition. The figures in this expression correspond to the proportions between silica and modifying oxides in the known compounds (silicates or aluminosilicates) with high content of silica, such as, for example, albite ($Na_2O$:$Al_2O_3$:$SiO_2$=1:1:6) or spodumene ($Li_2O$:$Al_2O_3$:$SiO_2$=1:1:4). The above ratio is not absolute, but serves as a guide that helps to avoid undesirable precipitation of corundum and, possibly, other crystalline phases at high temperatures. Accordingly, glass compositions according to embodiments meet the above ratio.

However, as known from the phase diagrams for aluminosilicate systems, the liquidus temperature of the glass compositions increases rapidly when the amount of $Al_2O_3$ exceeds the sum of the alkali oxides and alkaline earth oxides in the glass composition. Therefore, to maintain high mechanical performance and keep the liquidus viscosity high enough, more species should be added to a glass composition. For this purpose, the glass compositions may also include boron oxide ($B_2O_3$) and/or phosphorous oxide ($P_2O_5$).

However, being connected with $P_2O_5$, alumina still loses some part of positive effect on the mechanical properties. Therefore, for embodiments comprising $P_2O_5$, a correlation of components to the mechanical performance would be the difference $Al_2O_3$–$R_2O$–RO–$P_2O_5$, in mole percent. In embodiments, the glass composition may comprise $P_2O_5$ in amounts from greater than or equal to 0.0 mol % to less than or equal to 5.0 mol % and all ranges and sub-ranges between the foregoing values. In some embodiments, the glass composition may comprise $P_2O_5$ in amounts greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, or greater than or equal to 4.5 mol %. In embodiments, the glass composition may comprise $P_2O_5$ in an amount less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, or less than or equal to 0.5 mol %. It should be understood that, in embodiments, any of the above ranges may be combined with any other range. However, in some embodiments, the glass composition may comprise $P_2O_5$ in amounts from greater than or equal to 0.5 mol % to less than or equal to 4.5 mol %, from greater than or equal to 1.0 mol % to less than or equal to 4.0 mol %, from greater than or equal to 1.5 mol % to less than or equal to 3.5 mol %, or from greater than or equal to 2.0 mol % to less than or equal to 3.0 mol %, and all ranges and sub-ranges between the foregoing values.

Boron oxide ($B_2O_3$) is a flux which may be added to glass compositions to reduce the viscosity of the glass at a given temperature (e.g., the temperature corresponding to the viscosity of 200 poise or a 200 P temperature, at which glass is melted and which is usually the highest temperature in the glass melting furnace), thereby improving the quality and formability of the glass. At high concentrations, such as greater than or equal to about 10 mol %, boron oxide may suppress the crystallization of mullite. The presence of $B_2O_3$ may also improve damage resistance of the glass made from the glass composition. However, it has been found that additions of $B_2O_3$ significantly decrease the diffusivity of sodium and potassium ions in the glass compositions, which, in turn, adversely impacts the ion exchange performance of the resultant glass. In particular, it has been found that addition of $B_2O_3$ may increase the time required to achieve a given depth of layer in the glass relative to glass compositions which are boron free. The addition of $B_2O_3$ may also increase the temperature at which ion exchange is conducted in order to achieve an ion exchange rate necessary to reach a target depth of layer in the glass in a given duration of time. In embodiments, the glass composition may comprise $B_2O_3$ in amounts from greater than or equal to 0.0 mol % $B_2O_3$ to less than or equal to 8.0 mol % $B_2O_3$ and all ranges and sub-ranges between the foregoing values. In some embodiments, the glass composition may comprise $B_2O_3$ in amounts greater than or equal to 1.0 mol %, greater than or equal to 2.0 mol %, greater than or equal to 3.0 mol %, greater than or equal to 4.0 mol %, greater than or equal to 5.0 mol %, greater than or equal to 6.0 mol %, or greater than or equal to 7.0 mol %. In embodiments, the glass composition may comprise $B_2O_3$ in an amount less than or equal to 7.0 mol %, less than or equal to 6.0 mol %, less than or equal to 5.0 mol %, less than or equal to 4.0 mol %, less than or equal to 3.0 mol %, less than or equal to 2.0 mol %, or less than or equal to 1.0 mol %. It should be understood that, in embodiments, any of the above ranges may be combined with any other range. However, in some embodiments, the glass composition comprises $B_2O_3$ in amounts from greater than or equal to 1.0 mol % to less than or equal to 7.0 mol %, from greater than or equal to 2.0 mol % to less than or equal to 6.0 mol %, or from greater than or equal to 3.0 mol % to less than or equal to 5.0 mol % and all ranges and sub-ranges between the foregoing values.

In embodiments, the total amount of network forming components (e.g., $Al_2O_3+SiO_2+B_2O_3+P_2O_5$) is greater than or equal to 75.0 mol %, such as greater than or equal to 75.5 mol %, greater than or equal to 76.0 mol %, greater than or equal to 76.5 mol %, greater than or equal to 77.0 mol %, greater than or equal to 77.5 mol %, greater than or equal to 78.0 mol %, greater than or equal to 78.5 mol %, greater than or equal to 79.0 mol %, greater than or equal to 79.5 mol %, or greater than or equal to 80.0 mol %. Having a high amount of network forming agents increases the connectivity and free volume of the glass, which makes it less brittle and improves the damage resistance. In other embodiments, the total amount of network forming components is less than or equal to 85.0 mol %, less than or equal to 84.5 mol %, less than or equal to 84.0 mol %, less than or equal to 83.5 mol %, less than or equal to 83.0 mol %, less than or equal to 82.5 mol %, less than or equal to 82.0 mol %, less than or equal to 81.5 mol %, less than or equal to 81.0 mol %, less than or equal to 80.5 mol %, less than or equal to 80.0 mol %, less than or equal to 79.5 mol %, or less than or equal to 79.0 mol %. It should be understood that, in embodiments, any of the above ranges may be combined with any other range. However, in some embodiments, the total amount of network forming components is from greater than or equal to 75.5 mol % to less than or equal to 84.5 mol %, greater than or equal to 76.0 mol % to less than or equal to 84.0 mol %, greater than or equal to 76.5 mol % to less than or equal to 83.5 mol %, greater than or equal to 77.0 mol % to less than or equal to 83.0 mol %, greater than or equal to 77.5 mol % to less than or equal to 82.5 mol %, greater than or equal to 78.0 mol % to less than or equal to 82.0 mol %, greater than or equal to 78.5 mol % to less than or equal to 81.5 mol %, greater than or equal to 79.0 mol % to less than or equal to 81.0 mol %, or greater than or equal to 79.5 mol % to less than or equal to 80.5 mol %, and all ranges and sub-ranges between the foregoing values.

In embodiments, the glass article may be substantially free of one or both of arsenic and antimony.

The effect of $B_2O_3$ on ion exchange performance of the glass may be compensated for by adding greater amounts of $Li_2O$ and $Al_2O_3$ to the glass composition, which may compensate for the presence of $B_2O_3$ in the glass composition. For example, it has been determined that the impact of $B_2O_3$ on the ion exchange performance of a glass can be mitigated by controlling the ratio of $B_2O_3$ to the amount of $Li_2O$ and $Al_2O_3$ in the glass composition. In particular, it has been determined that in embodiments the sum of $Li_2O$ (mol %)+$Al_2O_3$ (mol %) is greater than two times the amount of $B_2O_3$ (mol %) in the glass composition, the diffusivities of alkali oxides in the resultant glass are not diminished and, as such, the ion exchange performance of the glass is maintained. Accordingly, in embodiments the boron oxide in the compositions comprising large amounts of both $Li_2O$ and $Al_2O_3$, so that $Li_2O>B_2O_3$ and $Al_2O_3>B_2O_3$ (all in mole %).

The presence of phosphorus oxide ($P_2O_5$) increases the liquidus viscosity of the glass compositions by suppressing the crystallization of mullite, spodumene, and some other species (e.g., spinel) from the glass-forming melts, when $Al_2O_3$ (mol %) is greater than $R_2O$ (mol %)+RO (mol %) by more than about 1 mol %. The presence of $P_2O_5$ in the glass composition compensates the excess $Al_2O_3$ by decreasing the liquidus temperature, thus increasing the liquidus viscosity of the glass composition. The addition of $P_2O_5$ allows reaching the positive values of $Al_2O_3$–$R_2O$–RO up to about 5.0 mol % without significant deterioration of the liquidus viscosity.

In embodiments, a relationship, in mol %, of $Al_2O_3/R_2O$ is greater than or equal to 1.00. Having a ratio of $Al_2O_3$ to $R_2O$ above 1.00 increases the strain and anneal points of the glass. This lowers the stress relaxation that can occur during ion exchange and results in greater compressive stress and central tension. This value is closely controlled in glass design to improve yields by reducing losses due to inclusions such as silica knots. In some embodiments, the molar ratio of $Al_2O_3/R_2O$ is greater than or equal to 1.06, greater than or equal to 1.10, greater than or equal to 1.20, greater than or equal to 1.30, greater than or equal to 1.40, greater than or equal to 1.50, greater than or equal to 1.60, greater than or equal to 1.70, greater than or equal to 1.80, greater than or equal to 1.90, or greater than or equal to 2.00. However, if the $Al_2O_3/R_2O$ ratio is too high, the glass may become susceptible to higher liquidus temperature and hence lower liquidus viscosity. In embodiments, a molar ratio of $Al_2O_3/R_2O$ is less than or equal to 2.10, less than or equal to 2.00, less than or equal to 1.90, less than or equal to 1.80, less than or equal to 1.70, less than or equal to 1.60, less than or equal to 1.50, less than or equal to 1.40, less than or equal to 1.30, less than or equal to 1.20, or less than or equal to 1.10. It should be understood that, in embodiments, any of the above ranges may be combined with any other range. However, in yet other embodiments, the molar ratio of $Al_2O_3/R_2O$ is from greater than or equal to 1.06 to less than or equal to 2.10, from greater than or equal to 1.10 to less than or equal to 1.90, from greater than or equal to 1.20 to less than or equal to 1.80, or from greater than or equal to 1.30 to less than or equal to 1.70 and all ranges and sub-ranges between the foregoing values.

Figure 2:
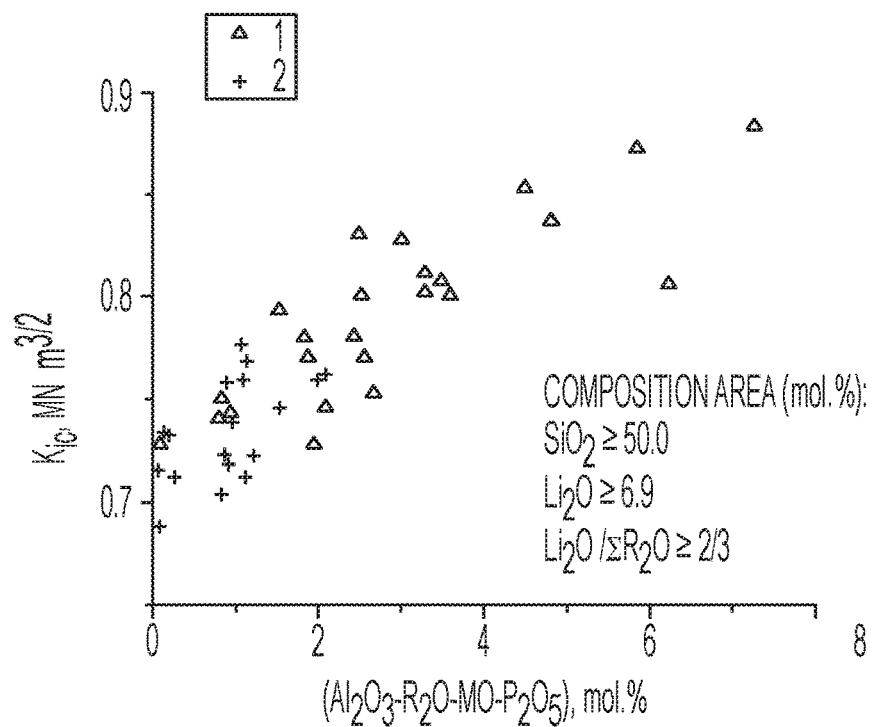
FIG. 2 is a graph showing fracture toughness ($K_{Ic}$) versus glass composition for comparative glass compositions and glass compositions according to embodiments disclosed and described herein.

According to embodiments, the difference $Al_2O_3$–$R_2O$–$RO$–$P_2O_5$ to higher values, such as from greater than or equal to 2.50 mol % to less than or equal to 7.25 mol %, such as greater than or equal to 2.75 mol % to less than or equal to 7.00 mol %, greater than or equal to 3.00 mol % to less than or equal to 6.75 mol %, greater than or equal to 3.25 mol % to less than or equal to 6.50 mol %, greater than or equal to 3.50 mol % to less than or equal to 6.25 mol %, greater than or equal to 3.75 mol % to less than or equal to 6.00 mol %, greater than or equal to 4.00 mol % to less than or equal to 5.75 mol %, greater than or equal to 4.25 mol % to less than or equal to 5.50 mol %, greater than or equal to 4.50 mol % to less than or equal to 5.25 mol %, or greater than or equal to 4.75 mol % to less than or equal to 5.00 mol %, and all ranges and sub-ranges between the foregoing values. Embodiments of glasses with high values of $Al_2O_3$–$R_2O$–$RO$–$P_2O_5$ confirm the high correlation between this ratio and key characteristics of the mechanical performance. FIG. 1 demonstrates the tendency of increasing Young's modulus with increasing the excess of alumina vs. modifying oxides ($R_2O$ and RO) plus $P_2O_5$. FIG. 2 demonstrates similar tendency for the fracture toughness. In both figures, Series 1 represents glasses according to embodiments disclosed and described herein, and the Series 2 shows the example compositions. In these and other figures, concentrations of oxides are presented in mol %, and the data related in the composition area restricted by the following limitations: $SiO_2 \geq 50.0$ mol %; $Li_2O \geq 6.9$ mol %; $Li_2O/R_2O \geq \frac{2}{3}$; $Al_2O_3$–$R_2O$–$RO$–$P_2O_5 \geq 0.0$ mol %, where $R_2O$ is a sum of all monovalent oxides in mol % and RO is a sum of all divalent oxides in mol %.

As seen from FIG. 1 and FIG. 2, at the highest values of ($Al_2O_3$–$R_2O$–$RO$–$P_2O_5$) a Young's modulus as high as 90 GPa and even around 100 GPa can be achieved, and a fracture toughness as high as 0.85 MN·m$^{3/2}$ and even around 0.90 MN·m$^{3/2}$ may be achieved.

The high Young's modulus and fracture toughness shown in FIG. 1 and FIG. 2 generally correlate to a high liquidus temperature (such as greater than 1300° C., and even greater than 1400° C.). Accordingly, the liquidus viscosity may become less than 100 Poises, and even less than 10 Poises. At such low liquidus viscosities, the conventional glass-forming methods used in the glass industry cannot be used. To address this glass compositions of embodiments disclosed and described herein comprise some amount of rare earth metal oxides.

The presence of rare earth metal oxides in the glass composition of embodiments may increase the modulus, stiffness, or modulus and stiffness, as well as the fracture toughness of the resultant glass. When the content of $Al_2O_3$ exceeds the total content of $R_2O$, RO and $P_2O_5$, rare earth metal oxides may also compensate the excess of $Al_2O_3$, which reduces the liquidus temperature, so that the liquidus viscosity may increase as well. Also, the rare earth metal oxides may reduce the high-temperature viscosity (including some decrease of a 200 P temperature), which makes a glass easier to melt, and, at the same time, increases the annealing and strain points, which makes a glass more durable at high temperatures. Accordingly, the resulting viscosity—temperature curve becomes considerably steeper, with increased low-temperature and decreased high-temperature viscosities. The middle part of this curve, in this situation, changes relatively slow. Therefore, if a liquidus temperature is low enough, the resulting effect of the rare earth metal oxides on the liquidus viscosity is small or even positive. However, this effect becomes negative and very big, as far as the liquidus temperature increases, which is possible if the rare earth metal oxides present in a glass composition at a relatively high content. In this case, they may form refractory compounds, such as lanthanum and yttrium disilicates, lanthanum aluminates, yttrium aluminum garnet (YAG) and others, which may raise the liquidus temperature and decrease the liquidus viscosity.

Rare earth metal oxides may be added to the glass composition to provide any number of physical and chemical attributes to the resulting glass article. Rare earth metal oxides refer to the oxides of metals listed in the Lanthanide Series of the IUPAC Periodic Table plus yttrium and scandium. The presence of rare earth metal oxides in the glass composition may increase the modulus, stiffness, or modulus and stiffness of the resultant glass. Rare earth metal oxides may also help to increase the liquidus viscosity of the glass composition. Additionally, certain rare earth metal oxides may add color to the glass. If no color is required or desired, then the glass composition may include lanthanum oxide ($La_2O_3$), yttrium oxide ($Y_2O_3$), gadolinium oxide ($Gd_2O_3$), ytterbium oxide ($Yb_2O_3$), lutetium oxide ($Lu_2O_3$), or combinations of these. For colored glasses, the rare earth metal oxides may include $Ce_2O_3$, $Pr_2O_3$, $Nd_2O_3$, $Sm_2O_3$, $Eu_2O_3$, $Tb_2O_3$, $Dy_2O_3$, $Ho_2O_3$, $Er_2O_3$, $Tm_2O_3$, or combinations of these. Some rare earth metal oxides such as $Ce_2O_3$ and $Gd_2O_3$ absorb UV radiation and thus cover glasses containing these oxides can protect OLED display devices from deleterious UV radiation. According to embodiments, the glass composition comprises rare earth oxides in a concentration of from greater than or equal to 0.0 mol % to less than or equal to 15.0 mol % and all ranges and sub-ranges between the foregoing values. In some embodiments, the glass composition comprises rare earth oxides in amounts greater than or equal to 0.1 mol %, greater than or equal to 1.0 mol %, greater than or equal to 2.0 mol %, greater than or equal to 4.0 mol %, greater than or equal to 6.0 mol %, greater than or equal to 8.0 mol %, greater than or equal to 10.0 mol %, greater than or equal to 12.0 mol %, or greater than or equal to 14.0 mol %. In some embodiments, the glass composition comprises rare earth oxides in amounts less than or equal to 14.0 mol %, less than or equal to 12.0 mol %, less than or equal to 10.0 mol %, less than or equal to 8.0 mol %, less than or equal to 6.0 mol %, less than or equal to 4.0 mol % less than or equal to 2.0 mol %, less than or equal to 1.0 mol %, or less than or equal to 0.1 mol %. It should be understood that, in embodiments, any of the above ranges may be combined with any other range. However, in some embodiments, the glass composition comprises rare earth oxides in an amount from greater than or equal to 0.1 mol % to less than or equal to 14.0 mol %, such as from greater than or equal to 0.5 mol % to less than or equal to 12.0 mol %, from greater than or equal to 1.0 mol % to less than or equal to 10.0 mol %, from greater than or equal to 2.0 mol % to less than or equal to 8.0 mol %, or from greater than or equal to 3.0 mol % to less than or equal to 6.0 mol %, and all ranges and sub-ranges between the foregoing values.

Young's modulus can be further increased by adding more rare earth metal oxides, but in this case the liquidus viscosity decreases, which may not be compatible with the conventional glass-forming processes, such as down-draw. Also, it was found that at too high concentrations of rare earth metal oxides, the chemical durability to acids may be deteriorated. Accordingly, for applications considering some contact of glasses with acid solutions and/or vapours, glasses with very high content of rare earth metal oxides are not recommended. At the same time, these glasses demonstrated a superior resistance to an alkali solution.

In embodiments, the glass composition may optionally include one or more fining agents. In some embodiments, the fining agents may include, for example, $SnO_2$. In such embodiments, $SnO_2$ may be present in the glass composition in an amount less than or equal to 0.2 mol %, such as from greater than or equal to 0.0 mol % to less than or equal to 0.1 mol % and all ranges and sub-ranges between the foregoing values. In other embodiments, $SnO_2$ may be present in the glass composition in an amount from greater than or equal to 0.0 mol % to less than or equal to 0.2 mol %, or greater than or equal to 0.1 mol % to less than or equal to 0.2 mol % and all ranges and sub-ranges between the foregoing values. In some embodiments, the glass composition may be free of $SnO_2$.

According to embodiments, a glass composition may be substantially free of Pb, F, As, Sb, Se, Te, Cd, Be and other ecologically unfriendly components. Also, a glass composition may be substantially free of very expensive species, like $Ta_2O_5$, and/or species that are known to generate undesirable adverse effects on physical properties described in the embodiments herein, such as, for example, $K_2O$, which reduces the stress formed through ion exchange; $ZrO_2$, which is known to rapidly increase the liquidus temperature and, therefore, decrease the liquidus viscosity of glasses; etc. In some embodiments, a glass composition may also be free of coloring agents, such as $TiO_2$, $FeO/Fe_2O_3$, MnO, and others, which may provide a glass article with undesirable color and/or decrease the optical transmittance of a glass article.

Figure 3:
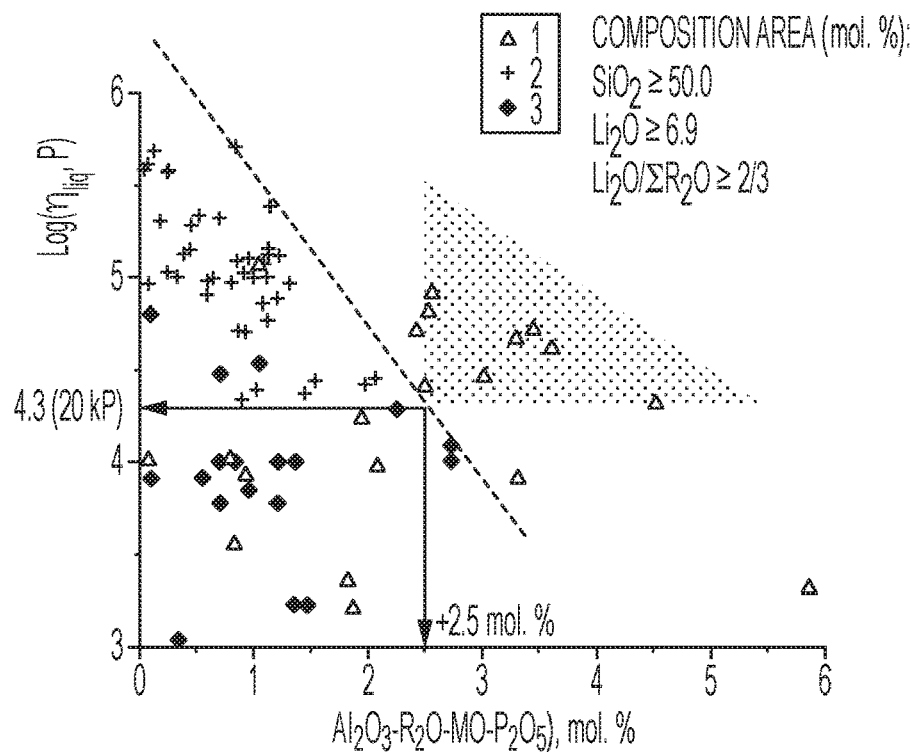
FIG. 3 is a graph showing liquidus viscosity ($\eta_{liq}$) versus glass composition for comparative glass compositions and glass compositions according to embodiments disclosed and described herein.
Figure 4:
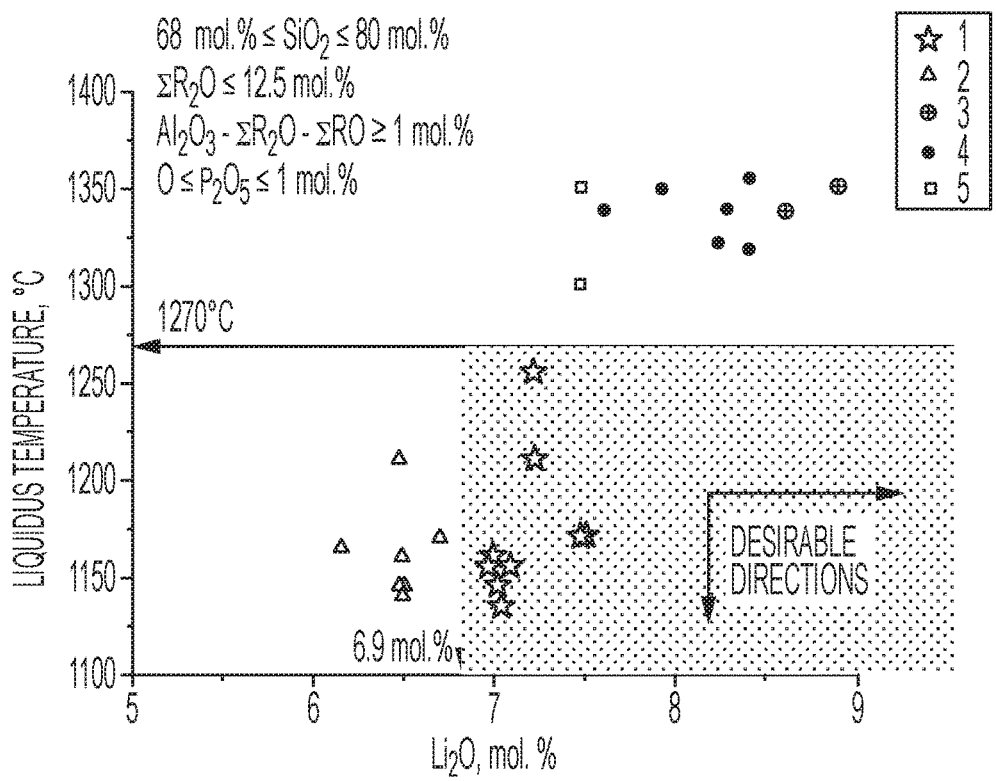
FIG. 4 is a graph showing liquidus temperature versus glass composition for comparative glass compositions and glass compositions according to embodiments disclosed and described herein.

FIG. 3 and FIG. 4 show the improved mechanical, viscous and crystallization properties of glass articles according to embodiments disclosed and described herein. In these figures, the Series 1 corresponds to glasses according to embodiments disclosed and described herein, the Series 2 and the Series 3 show properties of comparative glass samples.

FIG. 3 demonstrates the tendency of reducing the liquidus viscosity with increasing the excess of alumina vs. modifying oxides plus $P_2O_5$, and improvement of the combination of these two properties in embodiments disclosed and described herein. In FIG. 3, Series 3 corresponds to examples in the following patents and patent applications: U.S. Pat. Nos. 7,199,066; 7,071,131; 3,642,504; JP 2008115071; JP 2010116276; U.S. Pat. No. 3,625,718, U.S. Patent Application Publication No. 2016/326,045; and U.S. Pat. No. 3,834,911. The compositions of embodiments are within the following ranges: $SiO_2 \geq 50.0$ mol %; $Li_2O \geq 6.9$ mol %; $Li_2O/\Sigma R_2O \geq 2/3$.

The compositions and liquidus viscosities of the comparative examples 1-30 depicted in FIG. 3 are presented in Table 1 below.

TABLE 1

| Comp. ex. | 1 | 2 | 3 | 4 | 5 | 6 |
|---|---|---|---|---|---|---|
| Source | JP2008115071 | JP2010116276 | US2016326045 | U.S. Pat. No. 3,625,718 | U.S. Pat. No. 3,625,718 | U.S. Pat. No. 3,625,718 |
| $SiO_2$ | 64.94 | 74.96 | 60.08 | 73.90 | 73.94 | 75.97 |
| $Al_2O_3$ | 17.53 | 12.51 | 19.56 | 12.14 | 12.40 | 11.50 |
| $Li_2O$ | 11.62 | 8.24 | 7.89 | 7.59 | 8.28 | 8.27 |
| $TiO_2$ | 0.00 | 0.00 | 0.29 | 1.46 | 1.47 | 1.43 |
| BaO | 0.00 | 0.00 | 2.05 | 0.00 | 0.00 | 0.00 |
| $ZrO_2$ | 0.00 | 0.00 | 0.03 | 0.74 | 0.74 | 0.77 |
| MgO | 0.00 | 0.00 | 4.94 | 0.00 | 0.00 | 0.00 |
| $P_2O_5$ | 5.81 | 4.18 | 0.00 | 0.69 | 0.00 | 0.00 |
| $Na_2O$ | 0.00 | 0.00 | 0.21 | 0.42 | 1.24 | 0.51 |
| CaO | 0.00 | 0.00 | 3.94 | 0.00 | 0.42 | 0.00 |
| ZnO | 0.00 | 0.00 | 0.00 | 0.00 | 0.00 | 1.40 |
| $B_2O_3$ | 0.00 | 0.00 | 0.66 | 2.47 | 1.28 | 0.00 |
| $Li_2O/R_2O$ | 0.67 | 0.66 | 0.95 | 0.93 | 0.94 | 0.93 |
| $Al_2O_3 - R_2O - RO - P_2O_5$ | 0.10 | 0.09 | 0.35 | 0.84 | 1.03 | 1.18 |
| Log ($\eta_{liq}$ P) | 3.91 | 4.80 | 3.04 | 4.03 | 4.26 | 4.18 |

| Comp. ex. | 7 | 8 | 9 | 10 | 11 | 12 | 13 |
|---|---|---|---|---|---|---|---|
| Source | | | | U.S. Pat. No. 3,625,718 | | | |
| $SiO_2$ | 74.52 | 73.30 | 73.29 | 73.82 | 75.12 | 74.27 | 73.91 |
| $Al_2O_3$ | 11.93 | 12.26 | 12.34 | 12.25 | 12.41 | 12.43 | 13.26 |
| $Li_2O$ | 8.95 | 8.32 | 7.60 | 8.40 | 7.92 | 8.22 | 8.40 |
| $TiO_2$ | 1.44 | 1.48 | 1.54 | 1.53 | 1.52 | 1.46 | 1.45 |
| BaO | 0.00 | 0.00 | 0.00 | 0.00 | 0.00 | 0.00 | 0.00 |
| $ZrO_2$ | 0.83 | 1.33 | 0.68 | 0.73 | 0.78 | 0.73 | 0.78 |
| MgO | 0.00 | 0.00 | 0.00 | 0.00 | 0.00 | 0.00 | 0.00 |
| $P_2O_5$ | 0.00 | 1.25 | 0.64 | 0.63 | 0.00 | 0.68 | 0.00 |
| $Na_2O$ | 0.72 | 0.53 | 0.52 | 0.62 | 0.52 | 0.63 | 0.73 |
| CaO | 0.00 | 0.00 | 0.00 | 0.00 | 0.00 | 0.00 | 0.00 |
| ZnO | 1.41 | 1.29 | 2.63 | 1.27 | 1.34 | 1.27 | 1.27 |
| $B_2O_3$ | 0.00 | 0.00 | 0.00 | 0.00 | 0.00 | 0.00 | 0.00 |
| $Li_2O/R_2O$ | 0.91 | 0.93 | 0.92 | 0.92 | 0.93 | 0.91 | 0.91 |
| $Al_2O_3 - R_2O - RO - P_2O_5$ | 0.72 | 0.74 | 0.81 | 1.19 | 2.58 | 1.42 | 2.73 |
| Log ($\eta_{liq}$ P) | 4.19 | 3.51 | 3.97 | 4.24 | 4.06 | 4.28 | 4.00 |

| Comp. ex. | 14 | 15 | 16 | 17 | 18 | 19 | 20 | 21 | 22 |
|---|---|---|---|---|---|---|---|---|---|
| Source | U.S. Pat. No. 3,642,504 | U.S. Pat. No. 3,834,911 | | | | U.S. Pat. No. 7,071,131 | | | |
| $SiO_2$ | 66.21 | 75.12 | 74.57 | 73.33 | 73.60 | 72.70 | 72.77 | 72.54 | 73.30 |
| $Al_2O_3$ | 15.33 | 11.88 | 12.40 | 11.95 | 11.95 | 12.52 | 12.59 | 12.68 | 11.97 |
| $Li_2O$ | 7.99 | 8.60 | 8.89 | 7.43 | 7.42 | 7.46 | 7.47 | 7.47 | 7.43 |
| $TiO_2$ | 2.48 | 2.29 | 2.32 | 2.66 | 2.09 | 2.51 | 2.11 | 2.51 | 2.50 |
| BaO | 0.00 | 0.60 | 0.79 | 0.34 | 0.34 | 0.34 | 0.34 | 0.34 | 0.34 |
| $ZrO_2$ | 0.94 | 0.50 | 0.49 | 0.52 | 0.89 | 0.68 | 0.88 | 0.68 | 0.68 |
| MgO | 1.19 | 0.43 | 0.00 | 1.92 | 1.91 | 1.92 | 1.96 | 1.93 | 1.92 |
| $P_2O_5$ | 3.51 | 0.00 | 0.00 | 0.00 | 0.00 | 0.00 | 0.00 | 0.00 | 0.00 |
| $Na_2O$ | 0.66 | 0.00 | 0.00 | 0.16 | 0.16 | 0.16 | 0.18 | 0.18 | 0.16 |
| CaO | 0.00 | 0.00 | 0.00 | 0.00 | 0.00 | 0.00 | 0.00 | 0.00 | 0.00 |

TABLE 1-continued

| | | | | | | | | |
|---|---|---|---|---|---|---|---|---|
| ZnO | 1.43 | 0.00 | 0.00 | 1.28 | 1.28 | 1.29 | 1.32 | 1.29 | 1.28 |
| B₂O₃ | 0.00 | 0.00 | 0.00 | 0.00 | 0.00 | 0.00 | 0.00 | 0.00 | 0.00 |
| Li₂O/R₂O | 0.92 | 1.00 | 1.00 | 0.96 | 0.96 | 0.96 | 0.96 | 0.96 | 0.96 |
| Al₂O₃ − R₂O − RO − P₂O₅ | 0.55 | 2.25 | 2.72 | 0.70 | 0.70 | 1.22 | 1.20 | 1.36 | 0.71 |
| Log (η$_{liq}$, P) | 3.91 | 4.28 | 4.08 | 4.48 | 3.78 | 4.00 | 3.78 | 4.00 | 4.00 |

| Comp. ex. | 23 | 24 | 25 | 26 | 27 | 28 | 29 | 30 |
|---|---|---|---|---|---|---|---|---|
| Source | U.S. Pat. No. 7,199,066 | | | | | U.S. Pat. No. 8,652,979 | | |
| SiO₂ | 67.88 | 69.19 | 66.57 | 73.23 | 64.31 | 64.86 | 74.84 | 69.86 |
| Al₂O₃ | 13.23 | 12.59 | 13.88 | 12.23 | 16.54 | 17.49 | 12.49 | 14.99 |
| Li₂O | 8.38 | 7.73 | 9.04 | 7.46 | 7.70 | 11.66 | 8.33 | 9.99 |
| TiO₂ | 3.46 | 3.45 | 3.46 | 2.10 | 2.18 | 0.06 | 0.08 | 0.06 |
| BaO | 0.00 | 0.00 | 0.00 | 0.34 | 0.00 | 0.00 | 0.00 | 0.00 |
| ZrO₂ | 0.00 | 0.00 | 0.00 | 0.89 | 1.41 | 0.00 | 0.00 | 0.00 |
| MgO | 2.87 | 2.87 | 2.87 | 1.92 | 2.42 | 0.00 | 0.00 | 0.00 |
| P₂O₅ | 0.00 | 0.00 | 0.00 | 0.00 | 3.88 | 0.00 | 0.00 | 0.00 |
| Na₂O | 0.23 | 0.23 | 0.23 | 0.15 | 0.29 | 5.83 | 4.16 | 5.00 |
| CaO | 0.00 | 0.00 | 0.00 | 0.00 | 0.00 | 0.00 | 0.00 | 0.00 |
| ZnO | 1.74 | 1.73 | 1.74 | 1.29 | 0.86 | 0.00 | 0.00 | 0.00 |
| B₂O₃ | 1.85 | 1.84 | 1.85 | 0.00 | 0.00 | 0.00 | 0.00 | 0.00 |
| Li₂O/R₂O | 0.97 | 0.97 | 0.97 | 0.97 | 0.96 | 0.67 | 0.67 | 0.67 |
| Al₂O₃ − R₂O − RO − P₂O₅ | −0.03 | −0.01 | −0.04 | 0.96 | 1.35 | 0.01 | 0.01 | −0.01 |
| Log (η$_{liq}$, P) | 3.88 | 4.04 | 3.60 | 3.85 | 3.23 | 3.99 | 4.81 | 4.39 |

As seen from FIG. 3, the glass compositions disclosed in the embodiments herein are characterized by high liquidus viscosity, in the range from about 20000 Poises to about 80000 Poises, and very high peraluminous ratios ($Al_2O_3-R_2O-RO-P_2O_5$) from about 2.5 mol % to about 7.25 mol %, which results in high mechanical performance characterized by the Young's modulus greater than or equal to about 80 GPa. These combinations of composition and property characteristics show significant advantages of glass compositions according to embodiments disclosed and described herein.

FIG. 4 demonstrates the tradeoff between the content of lithium oxide and the liquidus temperature in the compositional space limited as follows: 68.0 mol %≤$SiO_2$≤80.0 mol %; $\Sigma R_2O$≤12.5 mol %; $Al_2O_3-\Sigma R_2O-\Sigma RO$≤1.0 mol %; 0.0 mol %≤$P_2O_5$≤1.0 mol %. This compositional space corresponds to a high silica content and, therefore, is characterized by high chemical durability and formability. In this FIG. 4, the series 1 corresponds to embodiments disclosed and described herein, series 2 corresponds comparative compositions disclosed in U.S. patent application Ser. No. 16/175,016 filed on Oct. 30, 2018, series 3 corresponds to glasses disclosed in U.S. Pat. No. 3,834,911; series 4 corresponds to glasses disclosed in U.S. Pat. No. 3,625,718; and series 5 corresponds to glasses disclosed in U.S. Pat. No. 7,071,131.

The compositions and liquidus temperatures of comparative examples 31-42 depicted in FIG. 4 are presented in Table 2 below.

These physical properties can be achieved by modifying the component amounts of the alkali aluminosilicate glass composition, as will be discussed in more detail with reference to the examples.

The fracture toughness $K_{Ic}$ is a property which describes the ability of a material containing a crack to resist fracture. The linear-elastic fracture toughness of a material is determined from the stress intensity factor $K_1$ (usually measured in MPa·m$^{1/2}$) at which a thin crack in the material begins to grow. The fracture toughness was measured by the chevron notch method on replicate specimens and averaged according to ASTM C1421-18. In embodiments, it is desirable to have a value of $K_{Ic}$ from greater than or equal to 0.75 MPa·m$^{1/2}$, such as greater than or equal to 0.80 MPa·m$^{1/2}$, greater than or equal to 0.85 MPa·m$^{1/2}$, greater than or equal to 0.90 MPa·m$^{1/2}$, greater than or equal to 0.85 MPa·m$^{1/2}$, greater than or equal to 1.00 MPa·m$^{1/2}$, greater than or equal to 1.05 MPa·m$^{1/2}$, or greater than or equal to 1.10 MPa·m$^{1/2}$. In some embodiments, the value of $K_{Ic}$ is less than or equal to 1.15 MPa·m$^{1/2}$, such as less than or equal to 1.10 MPa·m$^{1/2}$, less than or equal to 1.05 MPa·m$^{1/2}$, less than or equal to 1.00 MPa·m$^{1/2}$, less than or equal to 0.95 MPa·m$^{1/2}$, less than or equal to 0.90 MPa·m'$^{1/2}$, less than or equal to 0.85 MPa·m$^{1/2}$, or less than or equal to 0.80 MPa·m$^{1/2}$. It should be understood that, in embodiments, any of the above ranges may be combined with any other range. Accordingly, in embodiments, glass articles may have a $K_{Ic}$ value from greater than or equal to 0.75 MPa·m$^{1/2}$ to less than or equal

| Comp. ex. | 31 | 32 | 33 | 34 | 35 | 36 |
|---|---|---|---|---|---|---|
| Source | U.S. Pat. No. 3,625,718 | | | | | |
| $SiO_2$ | 75.12 | 73.82 | 73.29 | 75.97 | 73.90 | 74.27 |
| $Li_2O$ | 7.92 | 8.40 | 7.60 | 8.27 | 7.59 | 8.22 |
| $Al_2O_3$ | 12.41 | 12.25 | 12.34 | 11.50 | 12.14 | 12.43 |
| $TiO_2$ | 1.52 | 1.53 | 1.54 | 1.43 | 1.46 | 1.46 |
| BaO | 0.00 | 0.00 | 0.00 | 0.00 | 0.00 | 0.00 |
| $ZrO_2$ | 0.78 | 0.73 | 0.68 | 0.77 | 0.74 | 0.73 |
| MgO | 0.00 | 0.00 | 0.00 | 0.00 | 0.00 | 0.00 |
| $P_2O_5$ | 0.00 | 0.63 | 0.64 | 0.00 | 0.69 | 0.68 |
| $R_2O$ | 8.50 | 9.16 | 8.26 | 8.92 | 8.15 | 9.06 |
| $Al_2O_3 - R_2O - RO$ | 2.58 | 1.82 | 1.45 | 1.18 | 1.53 | 2.10 |
| Liquidus, °C. | 1349 | 1318 | 1338 | 1338 | 1338 | 1321 |

| Comp. ex. | 37 | 38 | 39 | 40 | 41 | 42 |
|---|---|---|---|---|---|---|
| Source | U.S. Pat. No. 3,625,718 | U.S. Pat. No. 7,071,131 | | | U.S. Pat. No. 3,834,911 | |
| $SiO_2$ | 73.91 | 72.77 | 72.70 | 72.54 | 75.12 | 74.57 |
| $Li_2O$ | 8.40 | 7.47 | 7.46 | 7.47 | 8.60 | 8.89 |
| $Al_2O_3$ | 13.26 | 12.59 | 12.52 | 12.68 | 11.88 | 12.40 |
| $TiO_2$ | 1.45 | 2.11 | 2.51 | 2.51 | 2.29 | 2.32 |
| BaO | 0.00 | 0.34 | 0.34 | 0.34 | 0.60 | 0.79 |
| $ZrO_2$ | 0.78 | 0.88 | 0.68 | 0.68 | 0.50 | 0.49 |
| MgO | 0.00 | 1.96 | 1.92 | 1.93 | 0.43 | 0.00 |
| $P_2O_5$ | 0.00 | 0.00 | 0.00 | 0.00 | 0.00 | 0.00 |
| $R_2O$ | 9.26 | 7.78 | 7.75 | 7.77 | 8.60 | 8.89 |
| $Al_2O_3 - R_2O - RO$ | 2.73 | 1.20 | 1.22 | 1.36 | 2.25 | 2.72 |
| Liquidus, °C. | 1354 | 1350 | 1300 | 1300 | 1337 | 1350 |

As seen from the FIG. 4, attempts to add more $Li_2O$, in order to increase the compression stress after ion exchange lead to increasing the liquidus temperature that may cause devitrification of the glass melt when forming the ribbon or articles. So, FIG. 4 shows that glasses according to some embodiments disclosed and described herein comprise high amount of $Li_2O$, such as exceeding about 6.9 mol %, and do not have a very high liquidus temperature, such as below 1270° C. This combination of attributes was not previously achievable.

Physical properties of the alkali aluminosilicate glass compositions as disclosed above will now be discussed.

to 1.15 MPa·m$^{1/2}$, such as greater than or equal to 0.80 MPa·m$^{1/2}$ to less than or equal to 1.10 MPa·m$^{1/2}$, greater than or equal to 0.85 MPa·m$^{1/2}$ to less than or equal to 1.05 MPa·m$^{1/2}$, or greater than or equal to 0.90 MPa·m$^{1/2}$ to less than or equal to 1.00 MPa·m$^{1/2}$, and all ranges and subranges between the foregoing values.

Embodiments of glass articles also have high elastic modulus (i.e., the ratio of the force exerted upon a substance or body to the resultant deformation). High elastic modulus makes a glass article more rigid and allows it to avoid large deformations under an external force that may take place. The most common of stiffness of a material is the Young's modulus E, (i.e., the relationship between stress (force per unit area) and strain (proportional deformation) in an article made of this material). The higher the Young's modulus of material, the less the deformation. In embodiments, the Young's modulus of a glass composition may be from greater than or equal to 80 GPa to less than or equal to 120 GPa, such as from greater than or equal to 85 GPa to less than or equal to 115 GPa, from greater than or equal to 90 GPa to less than or equal to 110 GPa, from greater than or equal to 95 GPa to less than or equal to 105 GPa, or from greater than or equal to 97 GPa to less than or equal to 100 GPa, and all ranges and sub-ranges between the foregoing values. In embodiments, the Young's modulus of the glass composition may be from greater than or equal to 90 GPa to less than or equal to 105 GPa, from greater than or equal to 91 GPa to less than or equal to 104 GPa, from greater than or equal to 92 GPa to less than or equal to 103 GPa, from greater than or equal to 93 GPa to less than or equal to 102 GPa, from greater than or equal to 94 GPa to less than or equal to 101 GPa, from greater than or equal to 95 GPa to less than or equal to 100 GPa, or from greater than or equal to 96 GPa to less than or equal to 99 GPa, and all ranges and sub-ranges between the foregoing values. The Young's modulus values recited in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

Another characteristic of glass articles according to embodiments combines two factors; Young's modulus and density as the specific modulus E/d (i.e., Young's modulus E divided by the density d). According to embodiments, the values of E/d should may be greater than or equal to 30 GPa·cm$^3$/gram, such as greater than or equal to 31 GPa·cm$^3$/gram, greater than or equal to 32 GPa·cm$^3$/gram, greater than or equal to 33 GPa·cm$^3$/gram, greater than or equal to 34 GPa·cm$^3$/gram, or greater than or equal to 35 GPa·cm$^3$/gram. According to some embodiments, the specific modulus E/d may be less than or equal to 40 GPa·cm$^3$/gram, such as less than or equal to 39 GPa·cm$^3$/gram, less than or equal to 38 GPa·cm$^3$/gram, less than or equal to 37 GPa·cm$^3$/gram, less than or equal to 36 GPa·cm$^3$/gram, less than or equal to 35 GPa·cm$^3$/gram, or less than or equal to 34 GPa·cm$^3$/gram. It should be understood that, in embodiments, any of the above ranges may be combined with any other range. In some embodiments, the specific modulus E/d may be from greater than or equal to 30 GPa·cm$^3$/gram to less than or equal to 40 GPa·cm$^3$/gram, such as greater than or equal to 31 GPa·cm$^3$/gram to less than or equal to 39 GPa·cm$^3$/gram, greater than or equal to 32 GPa·cm$^3$/gram to less than or equal to 38 GPa·cm$^3$/gram, greater than or equal to 33 GPa·cm$^3$/gram to less than or equal to 37 GPa·cm$^3$/gram, or greater than or equal to 34 GPa·cm$^3$/gram to less than or equal to 36 GPa·cm$^3$/gram, and all ranges and sub-ranges between the foregoing values. The density values used in this disclosure refer to a value as measured by the buoyancy method of ASTM C693-93(2013).

According to embodiments, the parameters for the ion exchange process include, but are not limited to, bath composition, temperature, and immersion time. According to embodiments, the ion exchange process takes place at temperatures from greater than or equal to 350° C. to less than or equal to 450° C. for a time from greater than or equal to 1 hour to less than or equal to 32 hours. The bath composition, according to embodiments, comprises, as major ingredients, sodium nitrate (NaNO$_3$) and potassium nitrate (KNO$_3$) in a variety of proportions, including baths comprised entirely of NaNO$_3$ and baths comprised entirely of KNO$_3$ and all combinations of NaNO$_3$ and KNO$_3$ there between, such as 30 mol % NaNO$_3$ and 70 mol % KNO$_3$, 50 mol % NaNO$_3$ and 50 mol % KNO$_3$, 70 mol % NaNO$_3$ and 30 mol % KNO$_3$. Also, in some embodiments, the salt bath may contain carbonates, chlorides and other compounds of alkali metals as additives that improve the performance of ion exchange process. It will be appreciated by those skilled in the art that the characteristics of the ion exchange process may vary, including the use of multiple immersion steps and/or multiple salt baths, additional steps such as annealing, washing, and the like, which are generally determined by the glass composition and the desired depth of layer and compressive stress of the glass composition that result from the ion exchange strengthening process. Also, the ion exchange process may be assisted with an electric field that applies an additional force to larger ions and increases their mobility and, therefore, increases the rate of diffusion.

To obtain a compressed layer with high compressive stress, it may be desirable to avoid the loss of this stress resulting from stress relaxation during the ion exchange process. To avoid this loss of stress, a glass composition according to embodiments may have a high viscosity at low temperatures. This can be measured by the annealing and strain points according to ASTM C598-93. According to embodiments, glass compositions have an annealing point measured according to the above standard of greater than or equal to 600° C., such as greater than or equal to 605° C., greater than or equal to 610° C., greater than or equal to 615° C., greater than or equal to 620° C., greater than or equal to 625° C., greater than or equal to 630° C., greater than or equal to 635° C., greater than or equal to 640° C., greater than or equal to 645° C., or greater than or equal to 650° C. According to some embodiments, glass compositions have an annealing point measured according to the above standard of less than or equal to 675° C., such as less than or equal to 670° C., less than or equal to 665° C., less than or equal to 660° C., less than or equal to 655° C., or less than or equal to 650° C. It should be understood that, in embodiments, any of the above ranges may be combined with any other range. In some embodiments, glass compositions have an annealing point measured according to the above standard from greater than or equal to 600° C. to less than or equal to 675° C., such as greater than or equal to 605° C. to less than or equal to 670° C., greater than or equal to 610° C. to less than or equal to 665° C., greater than or equal to 615° C. to less than or equal to 665° C., greater than or equal to 620° C. to less than or equal to 660° C., greater than or equal to 625° C. to less than or equal to 655° C., greater than or equal to 630° C. to less than or equal to 650° C., or greater than or equal to 635° C. to less than or equal to 645° C., and all ranges and sub-ranges between the foregoing values.

Some embodiments disclosed and described herein focus on ion exchange of lithium ion (Li+) for larger ions, such as sodium ion (Na+) for example, as this ion exchange allows the formation of the surface layer of the same depth within the fastest process time at low temperatures.

According to embodiments, the CTE of a glass article may determine the possible changes of the linear size of the substrate caused by temperature changes. The less the CTE, the less temperature-induced deformation. This property is measured by using a horizontal dilatometer (push-rod dilatometer) in accordance with ASTM E228-11. According to embodiments, the CTE of glass articles may be less than or equal to 70×10$^{-7}$/K, such as less than or equal to 69×10$^{-7}$/K, less than or equal to 68×10$^{-7}$/K, less than or equal to 67×10$^{-7}$/K, less than or equal to 66×10$^{-7}$/K, less than or equal to $65\times10^{-7}$/K, less than or equal to $64\times10^{-7}$/K, less than or equal to $63\times10^{-7}$/K, less than or equal to $62\times10^{-7}$/K, less than or equal to $61\times10^{-7}$/K, less than or equal to $60\times10^{-7}$/K, less than or equal to $59\times10^{-7}$/K, less than or equal to $58\times10^{-7}$/K, less than or equal to $57\times10^{-7}$/K, less than or equal to $56\times10^{-7}$/K, or less than or equal to $55\times10^{-7}$/K. In some embodiments, the CTE of glass articles may be greater than or equal to $50\times10^{-7}$/K, such as greater than or equal to $51\times10^{-7}$/K, greater than or equal to $52\times10^{-7}$/K, greater than or equal to $53\times10^{-7}$/K, or greater than or equal to $54\times10^{-7}$/K. It should be understood that, in embodiments, any of the above ranges may be combined with any other range. In some embodiments, the CTE of a glass article may be from greater than or equal to $50\times10^{-7}$/K to less than or equal to $70\times10^{-7}$/K, such as greater than or equal to $51\times10^{-7}$/K to less than or equal to $69\times10^{-7}$/K, greater than or equal to $52\times10^{-7}$/K to less than or equal to $68\times10^{-7}$/K, greater than or equal to $53\times10^{-7}$/K to less than or equal to $67\times10^{-7}$/K, greater than or equal to $54\times10^{-7}$/K to less than or equal to $66\times10^{-7}$/K, greater than or equal to $55\times10^{-7}$/K to less than or equal to $65\times10^{-7}$/K, greater than or equal to $56\times10^{-7}$/K to less than or equal to $64\times10^{-7}$/K, greater than or equal to $57\times10^{-7}$/K to less than or equal to $63\times10^{-7}$/K, greater than or equal to $58\times10^{-7}$/K to less than or equal to $62\times10^{-7}$/K, or greater than or equal to $59\times10^{-7}$/K to less than or equal to $61\times10^{-7}$/K, and all ranges and sub-ranges between the foregoing values.

According to embodiments, the glass composition may be melted at a temperature corresponding to the viscosity of 200 Poises (200 P temperature). The relationship between the viscosity and temperature of a glass-forming melt is, essentially, a function of chemical composition of the glass that is melted. The glass viscosity was measured by the rotating crucible method according to ASTM C965-96 (2017). According to embodiments, the melting temperature of the glass composition may be less than or equal to 1800° C., such as less than or equal to 1750° C., less than or equal to 1700° C., less than or equal to 1650° C., less than or equal to 1600° C., less than or equal to 1550° C., less than or equal to 1500° C., less than or equal to 1450° C., less than or equal to 1400° C., less than or equal to 1350° C., or less than or equal to 1300° C. In some embodiments, the melting temperature of glass compositions may be greater than or equal to 1100° C., such as greater than or equal to 1150° C., greater than or equal to 1200° C., greater than or equal to 1250° C., greater than or equal to 1300° C., or greater than or equal to 1350° C. It should be understood that, in embodiments, any of the above ranges may be combined with any other range. In some embodiments, the melting temperature of the glass composition may be from greater than or equal to 1100° C. to less than or equal to 1800° C., such as greater than or equal to 1150° C. to less than or equal to 1750° C., greater than or equal to 1200° C. to less than or equal to 1700° C., greater than or equal to 1250° C. to less than or equal to 1650° C., greater than or equal to 1300° C. to less than or equal to 1600° C., greater than or equal to 1350° C. to less than or equal to 1550° C., or greater than or equal to 1400° C. to less than or equal to 1500° C., and all ranges and sub-ranges between the foregoing values.

After the batch materials are melted, it is desirable avoid crystallization when forming a glass sheet, ribbon, or other articles from the said melt. For glass-forming substances, the main numerical characteristic of the crystallization process is the liquidus temperature, TL, that specifies the minimum temperature above which a material is completely liquid, and the maximum temperature at which crystals can co-exist with the melt in thermodynamic equilibrium. This property is measured by the gradient method. This method conforms to ASTM C829-81 Standard Practices for Measurement of Liquidus Temperature of Glass. Accordingly, the glass forming process normally takes place at the temperature higher than TL. On the other hand, the liquidus viscosity of the glass composition can be used to determine which forming processes that can be used to make glass into a sheet is determined by the liquidus viscosity. The greater the liquidus viscosity the more forming processes will be compatible with the glass. Since glass viscosity decreases exponentially with temperature, it is desirable to keep the liquidus temperature as low as possible to maximize the viscosity at the liquidus. For float processing the glass composition generally has a liquidus viscosity of at least 10 kP, and the fusion process requires a liquidus viscosity of at least 50 kP, such as at least 100 kP, or at least 500 kP. For other processes, such as hot pressing, twin-rollers technique, etc. the viscosity value may be considerably lower. For example, for hot pressing that is used on occasion in optical industry, a liquidus viscosity of 10 to 20 poises may be satisfactory.

Figure 7A:
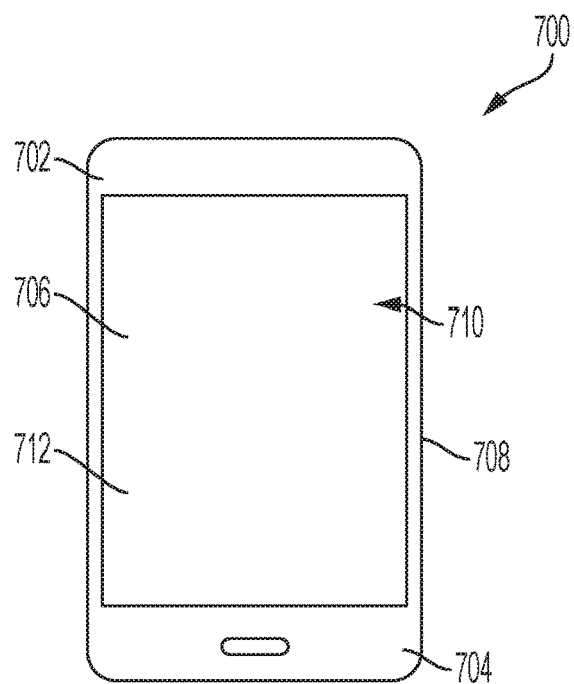
FIG. 7A and FIG. 7B are schematics showing electronic devices according to embodiments disclosed and described herein.
Figure 7B:
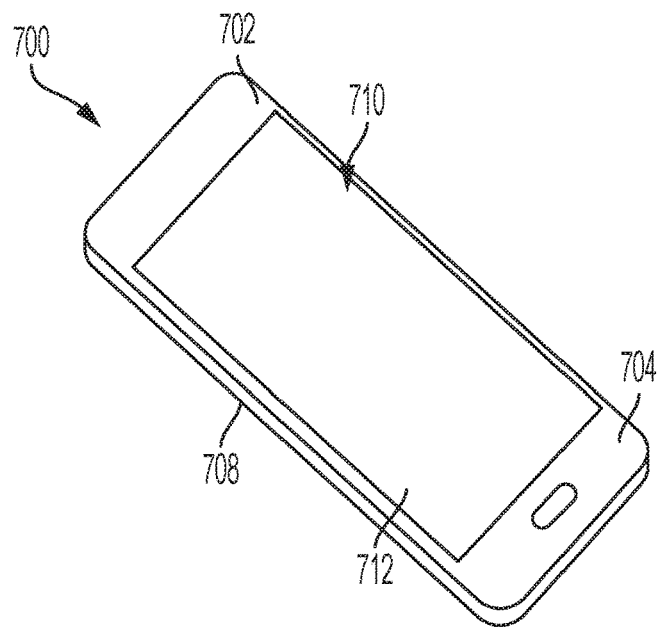

The glass articles disclosed herein may be incorporated into another article such as an article with a display (or display articles) (e.g., consumer electronics, including mobile phones, tablets, computers, navigation systems, and the like), architectural articles, transportation articles (e.g., automotive, trains, aircraft, sea craft, etc.), appliance articles, or any article that requires some transparency, scratch-resistance, abrasion resistance or a combination thereof. In some embodiments, glass articles may be used as substrates for recording medium. An exemplary article incorporating any of the glass articles disclosed herein is shown in FIGS. 7A and 7B. Specifically, FIGS. 7A and 7B show a consumer electronic device 700 including a housing 702 having front 704, back 706, and side surfaces 208; electrical components (not shown) that are at least partially inside or entirely within the housing and including at least a controller, a memory, and a display 710 at or adjacent to the front surface of the housing; and a cover substrate 712 at or over the front surface of the housing such that it is over the display. In some embodiments, the cover substrate 712 may include any of the glass articles disclosed herein.

EXAMPLES

Embodiments will be further clarified by the following examples. It should be understood that these examples are not limiting to the embodiments described above.

Example glasses were melted with conventional raw materials, such as sand, aluminum oxide, alkali carbonates, alkali nitrates, spodumene, nepheline syenite, borax, boric acid, aluminum metaphosphate, disodium phosphate, magnesium oxide, rare earth metal oxides, tin oxide and various combinations according to Table 1 below. The glasses were melted in platinum crucibles between 1500° C. and 1575° C. for 5 to 6 hours, drigaged and then re-melted at a higher temperature between 1570° C. and 1650° C. for 5 to 6 hours to improve homogeneity and melt quality. The glasses were then cast onto a steel plate and annealed for 1 hour near the anneal temperatures given in Table 1 below. Samples were cut and polished for property measurements and ion exchange experiments. The samples prepared for ion exchange tests were made 0.8 mm thick. The annealed glass attains a higher central tension (CT) as shown in FIG. 1, but takes a longer time to ion exchange and get to peak CT. The ion exchange conditions are between 365° C. and 440° C. at times between 1 hour and 10 hours for 0.5 mm to 1 mm thick glass articles. Bath compositions range from 1% to 100% NaNO$_3$ and from 0 to 99% KNO$_3$ and usually contain 0.1% to 2% silicic acid.

The melted glass samples were subjected to the following tests.

The density at room temperature was measured by Archimedes method.

The thermal expansion in the temperature range from 20° C. to 300° C. was measured by using a horizontal dilatometer.

The elastic moduli and Poisson's ratio were measured by using RUS.

The fracture toughness was measured by using Chevron Notched Short Bar method.

The viscosity was measured by using beam bending method (10$^{12}$ Poises and higher), parallel plate method (around 10$^{7.6}$ Poises) and rotation method (below 10$^6$ Poises).

The liquidus temperature was measured by using gradient method with the hold time of 24 hours.

The chemical durability was measured by immersing the glass samples to 5 mass % water solution of HCl at 95° C. for 24 hours and 5 mass % NaOH at 95° C. for 6 hours. Before making tests, the samples were rinsed under distilled water (16 MS) resistance) for 5 minutes while squeezing the Tygon tubing to make a shower-like rinse; ultrasonicated (50/60 Hz frequency) in 60° C. to 65° C. 4% Semiclean Detergent bath for one minute; again, rinsed under 16 MΩ distilled water for 5 minutes while squeezing the Tygon tubing to make a shower-like rinse; followed by a final rinse in a cascading 18 MΩ distilled water bath for 5 minutes. The samples were then transferred onto glass racks on stainless steel trays and dried in a 110° C. oven for an hour, and placed in a desiccator until used. HCl tests were done in Pyrex tubes in hot water bath; NaOH was done in platinum tubes, same bath type. After the treatment, the samples were flood-rinsed in 16 and 18 MΩ distilled water, dried in a 110° C. oven for about 30 minutes, and weighed to determine the loss of mass.

Compressive stress (including surface CS) after ion exchange was measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient".

Examples 1-40

These examples show lithium aluminosilicate glass compositions comprising rare earth metal oxides. As follows from Table 1, in these examples it appears possible to reach liquidus temperatures from 1155° C. to 1205° C. for glasses with the ratio Al$_2$O$_3$–R$_2$O–RO–P$_2$O$_5$ from about 3.3 mol % to about 7.25 mol % and the ratio Al$_2$O$_3$–R$_2$O–RO up to about 7.8 mol %, containing from about 7.6 mol % to about 8.5 mol % Li$_2$O and not more than about 10.0 mol % alkali metal oxides in total. These examples have liquidus viscosities between about 1 kPoise and about 80 kPoises, Young's moduli between about 80 GPa and about 100 GPa, specific modulus between about 28 GPa·cm$^3$/gram and about 38 GPa·cm$^3$/gram, fracture toughness up to about 0.9 MPa·m$^{1/2}$, and CTE at 200° C. to 300° C. between about 48·10$^{-7}$/K and about 67·10$^{-7}$/K. All of these glasses have high chemical durability to an alkali solution (loss of mass from 0.3 to 2.66 mg/cm$^2$ after the test as described above), and some of them have acceptable durability to an acid solution.

Examples 41-57

These examples show lithium aluminosilicate glass compositions without rare earth metal oxides. As follows from Table 1, in this case it was also possible to reach very high values of the ratio Al$_2$O$_3$–R$_2$O–RO, up to about 11.0 mol %, and high ratio Al$_2$O$_3$–R$_2$O–RO–P$_2$O$_5$, up to about 6.2 mol %. In these examples, the low liquidus temperatures (down to 1180° C.) were reached, although not as low as in the previous examples. For some compositions having the ratio Al$_2$O$_3$–R$_2$O–RO of about 4.0 mol %, a liquidus viscosity of greater than 100 kP was reached, which makes these compositions compatible with the fusion draw process. However, in these examples it was not possible reach the highest values of the ratio Al$_2$O$_3$–R$_2$O–RO–P$_2$O$_5$ achieved in the previous examples. However, when adding a high amount of MgO, it was still possible to reach high values of the Young's modulus, such as exceeding 80 GPa, at liquidus temperatures from 1210° C. to 1250° C. and liquidus viscosities up to 10$^{4.6}$ Poises, which makes these glass compositions compatible to the conventional float method and some kinds of the fusion method.

FIG. 5A-FIG. 6C show the stress profiles of some of glasses according to embodiments disclosed and described herein after ion exchange. The ion exchange has been performed in the bath with molten NaNO$_3$ on the samples that were preliminarily annealed at the temperatures corresponding to the annealing points specified in Table 1 for 1-2 hours and then cooled in the furnace.

Figure 5A:
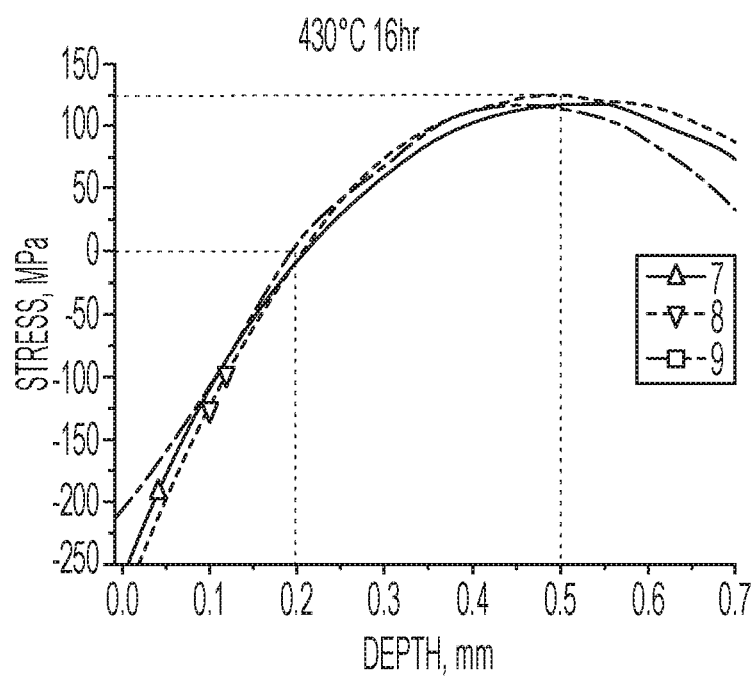
FIG. 5A to FIG. 5C are graphs showing stress versus depth for glass compositions according to embodiments disclosed and described herein.
Figure 5B:
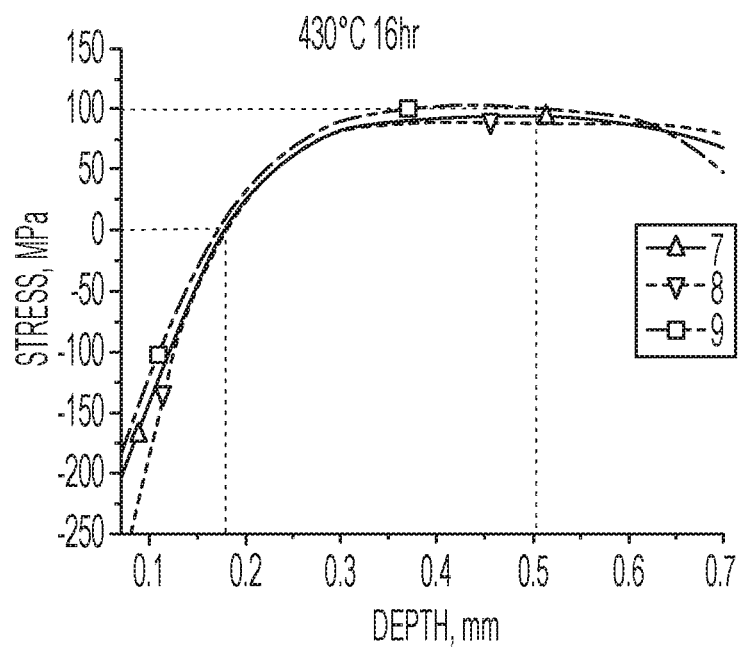
Figure 5C:
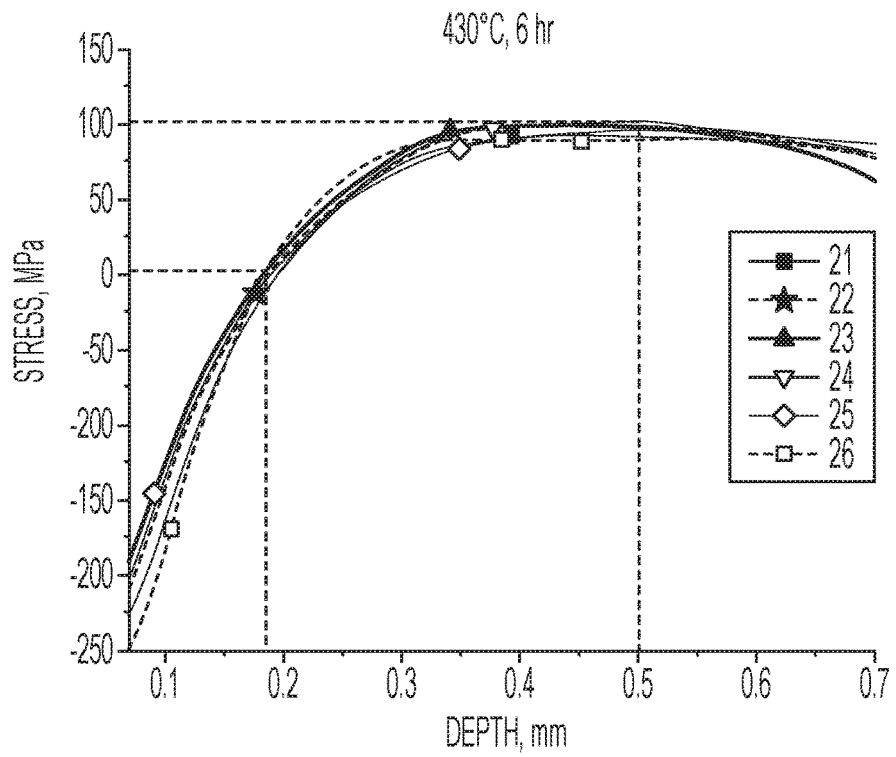

FIG. 5A and FIG. 5B show the data for same Examples 7, 8 and 9 in Table 1 treated for 16 hours (A) and 6 hours (B). FIG. 5C shows the data obtained after treatment for 6 hours for Examples 21-26 shown in Table 1.

As shown in FIG. 5A, the examples treated for 16 hours demonstrate parabolic profile at high stress, with zero stress observed at about 20% of the sample thickness, which indicates that the ion exchange has performed through the whole 1 mm thickness of the sample.

In contrast, when treating for only 6 hours (FIG. 5B and FIG. 5C), the stress profiles are not exactly parabolic, but close to parabolic, with zero points corresponding to 18% to 19% of the sample thickness, which indicates that almost all space of the sample is under ion exchange. The level of stress at this case is only about 20% less than in the previous case, which indicates the possibility to reach high enough stress level at a comparably low time of exchange.

Figure 6A:
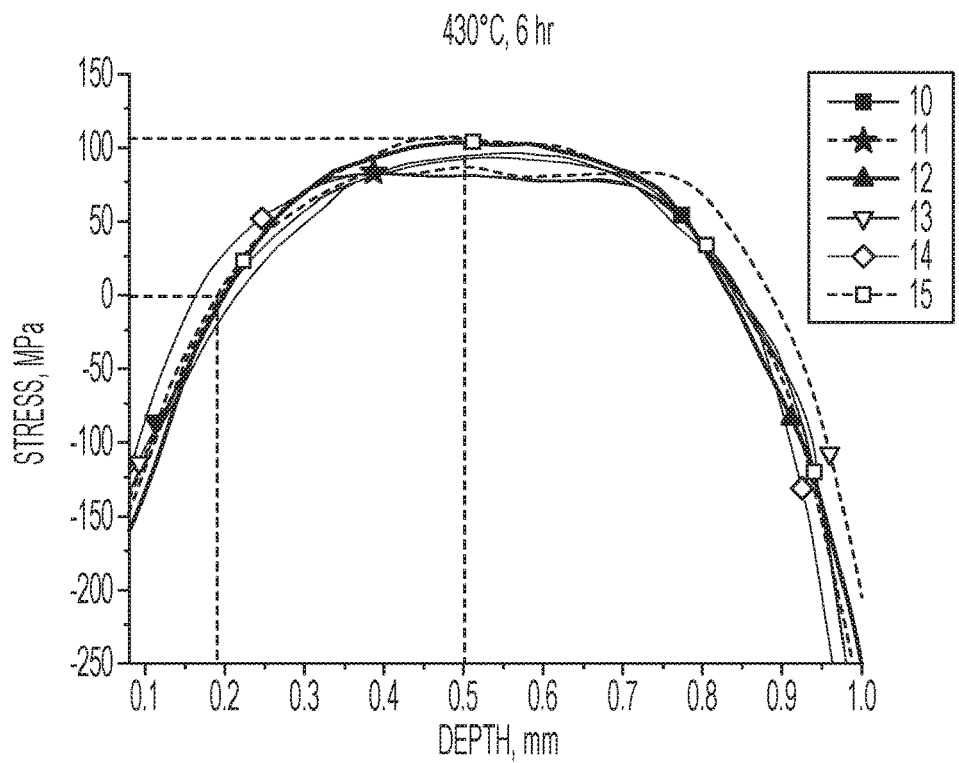
FIG. 6A to FIG. 6C are graphs showing stress versus depth for glass compositions according to embodiments disclosed and described herein.
Figure 6B:
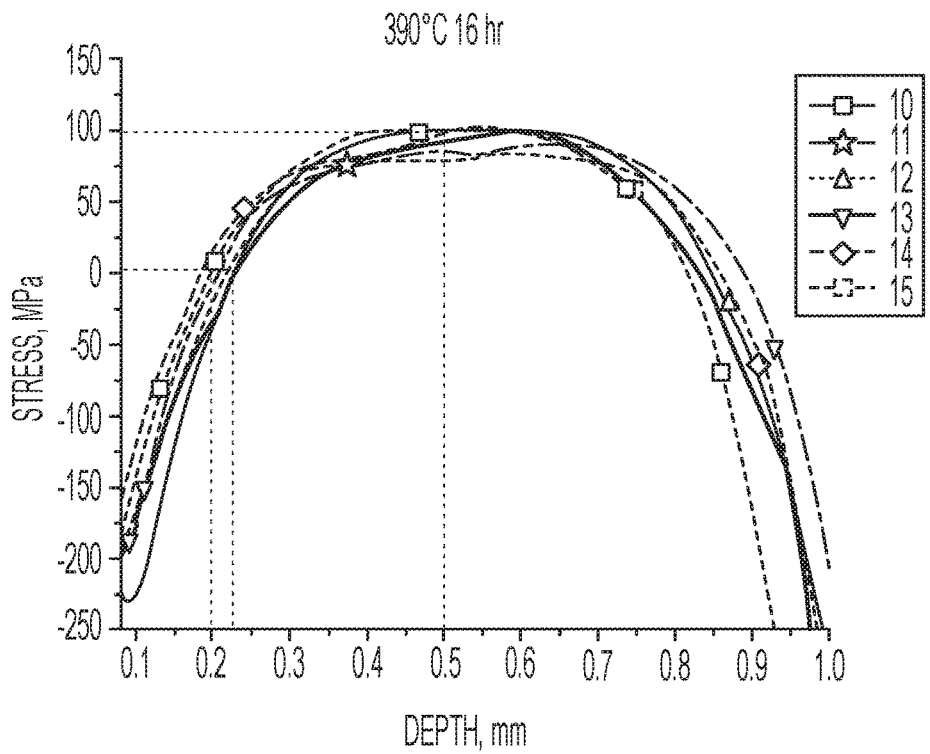
Figure 6C:
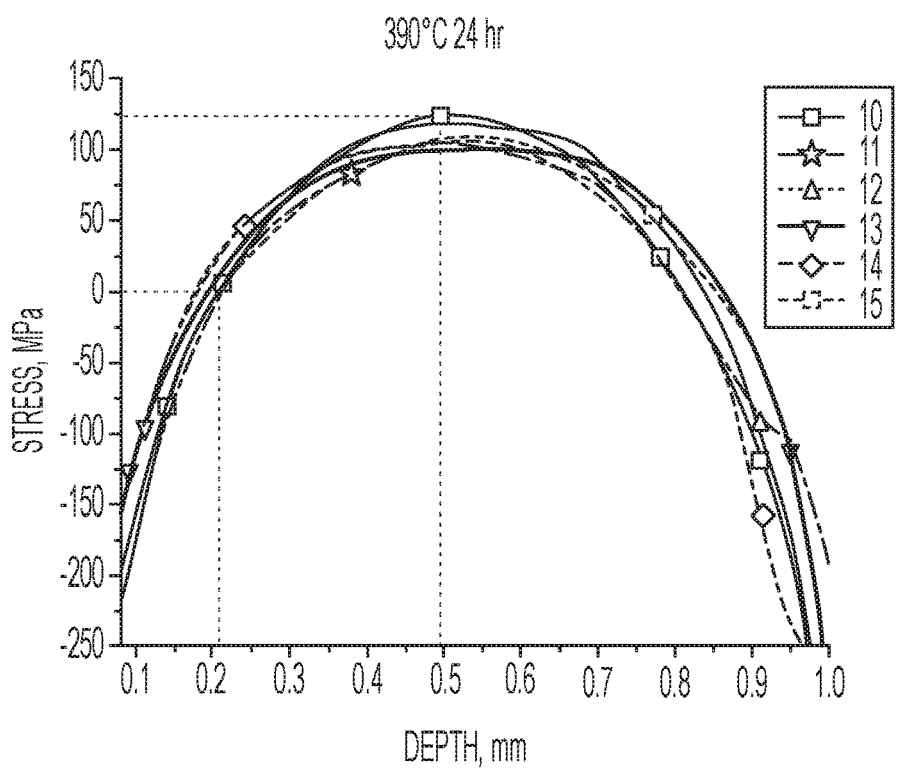

FIG. 6A shows the stress profiles obtained after ion exchange for Examples 10-15 in Table 1 that were treated at 430° C. for 6 hours, FIG. 6B shows the same examples treated at 390° C. for 16 hours, and FIG. 6C shows the same samples treated at 390° C. for 24 hours. As shown in FIG. 6A to FIG. 6B, in both cases the stress profiles are close to the parabolic form at high enough stress level. The highest value of the central tension stress (up to 125 MPa) at nearly exact parabolic stress profile has been observed after treatment at 390° C. for 24 hours (FIG. 6C). However, shown in FIG. 6A and FIG. 6B, lower duration of ion exchange at this and higher temperature gives similar stress level at the surface and nearly parabolic profile, that indicates the ion exchange at nearly whole sample thickness (1 mm).

The level of stress after ion exchange is, in much extent, determined by the content of $Li_2O$ in a glass composition. So, the highest stress level is obtained for the Example 20 and Example 49 that comprise the maximum amount of $Li_2O$, (i.e., from 9 mol % to 10 mol %). Example 20 demonstrates the maximum central tension stress of 173 MPa, which, according to the parabolic law, corresponds to the compression stress at the surface of about 350 GPa.

Compositions and various properties of glasses according to embodiments are provided in Table 3 below.

TABLE 3

| Example # | 1 | 2 | 3 | 4 | 5 | 6 | 7 | 8 | 9 |
|---|---|---|---|---|---|---|---|---|---|
| Mol. % by analysis | | | | | | | | | |
| $SiO_2$ | 63.33 | 61.56 | 57.11 | 50.94 | 69.71 | 60.94 | 63.94 | 64.96 | 64.96 |
| $Al_2O_3$ | 15.33 | 17.20 | 18.02 | 16.5 | 15.79 | 16.48 | 16.48 | 14.99 | 14.99 |
| $B_2O_3$ | 5.78 | 6.98 | 7.8 | 7.15 | 0 | 6.50 | 3.49 | 5.49 | 4.99 |
| $P_2O_5$ | 0 | 0.20 | 0.53 | 0 | 0 | 0 | 2.00 | 0 | 1.50 |
| $Li_2O$ | 7.68 | 7.96 | 7.98 | 8.5 | 10.26 | 7.08 | 7.08 | 7.09 | 7.09 |
| $Na_2O$ | 2.3 | 1.31 | 1.16 | 0.1 | 0.1 | 2.89 | 2.89 | 2.89 | 2.89 |
| $K_2O$ | 0 | 0.00 | 0 | 0 | 0.1 | 0 | 0 | 0 | 0 |
| MgO | 0.11 | 1.06 | 1.2 | 0.06 | 0.02 | 0.99 | 1.00 | 1.01 | 1.00 |
| CaO | 1.94 | 0.03 | 0.02 | 3.2 | 0.04 | 1.00 | 0.01 | 0.99 | 1.00 |
| $Y_2O_3$ | 0 | 3.60 | 6.08 | | 3.91 | 2.00 | 3.00 | 2.50 | 1.50 |
| $La_2O_3$ | 3.4 | 0.00 | 0 | 13.35 | 0 | 0 | 0 | 0 | 0 |
| $CeO_2$ | 0.02 | 0.00 | 0 | 0.08 | 0 | 0 | 0 | 0 | 0 |
| $ZrO_2$ | 0 | 0.00 | 0 | 0 | 0 | 0 | 0 | 0 | 0 |
| $TiO_2$ | 0 | 0.00 | 0 | 0 | 0 | 0 | 0 | 0 | 0 |
| $SnO_2$ | 0.1 | 0.10 | 0.1 | 0.1 | 0.0979 | 0.10 | 0.10 | 0.07 | 0.07 |
| Composition ratios (mol. %) | | | | | | | | | |
| $R_2O$ | 10 | 10.00 | 9.06 | 8.53 | 10.47 | 9.97 | 9.98 | 9.97 | 9.97 |
| $Al_2O_3 - R_2O$ | 5.35 | 7.08 | 9 | 8.03 | 5.33 | 6.51 | 6.50 | 5.02 | 5.02 |
| $Al_2O_3 - R_2O - RO$ | 3.3 | 6.05 | 7.8 | 4.82 | 5.31 | 4.51 | 5.49 | 3.02 | 3.02 |
| $Al_2O_3 - R_2O - RO - P_2O_5$ | 3.3 | 5.86 | 7.27 | 4.82 | 5.31 | 4.51 | 3.50 | 3.02 | 1.52 |
| $SiO_2 + P_2O_5$ | 63.33 | 61.76 | 57.64 | 50.94 | 69.71 | 60.94 | 65.94 | 64.96 | 66.46 |
| REmOn | 3.42 | 3.60 | 6.08 | 13.43 | 3.91 | 2.00 | 3.00 | 2.50 | 1.50 |
| $SiO_2 + B_2O_3 + P_2O_5$ | 69.11 | 68.74 | 65.44 | 58.09 | 69.71 | 67.44 | 69.43 | 70.45 | 71.46 |
| Wt % by analysis | | | | | | | | | |
| $SiO_2$ | 51.55 | 51.81 | 44.94 | 30.42 | 59.57 | 49.47 | 53.56 | 56.76 | 57.14 |
| $Al_2O_3$ | 21.17 | 24.57 | 24.07 | 16.72 | 22.89 | 22.70 | 23.42 | 22.22 | 22.38 |
| $B_2O_3$ | 5.45 | 6.81 | 7.11 | 4.95 | 0 | 6.11 | 3.39 | 5.56 | 5.09 |
| $P_2O_5$ | 0 | 0.39 | 0.99 | 0 | 0 | 0 | 3.95 | 0 | 3.12 |
| $Li_2O$ | 3.11 | 3.33 | 3.12 | 2.52 | 4.36 | 2.86 | 2.95 | 3.08 | 3.10 |
| $Na_2O$ | 1.93 | 1.14 | 0.94 | 0.06 | 0.09 | 2.42 | 2.50 | 2.60 | 2.62 |
| $K_2O$ | 0 | 0.01 | 0 | 0 | 0.04 | 0 | 0 | 0 | 0 |
| MgO | 0.06 | 0.60 | 0.63 | 0.02 | 0.01 | 0.54 | 0.56 | 0.59 | 0.59 |
| CaO | 1.47 | 0.03 | 0.01 | 1.78 | 0.03 | 0.76 | 0.01 | 0.81 | 0.82 |
| $Y_2O_3$ | 0 | 11.39 | 17.98 | 0 | 12.56 | 6.09 | 9.43 | 8.20 | 4.96 |
| $La_2O_3$ | 15.01 | 0.00 | 0 | 43.23 | 0 | 8.79 | 0 | 0 | 0 |
| $CeO_2$ | 0.05 | 0.00 | 0 | 0.14 | 0 | 0 | 0 | 0 | 0 |
| $ZrO_2$ | 0 | 0.00 | 0 | 0 | 0 | 0 | 0 | 0 | 0 |
| $TiO_2$ | 0 | 0.00 | 0 | 0 | 0 | 0 | 0 | 0 | 0 |
| $SnO_2$ | 0.2 | 0.21 | 0.2 | 0.15 | 0.21 | 0.20 | 0.21 | 0.15 | 0.15 |
| Composition ratios (wt %) | | | | | | | | | |
| $R_2O$, wt % | 5.04 | 5.06 | 4.06 | 2.59 | 4.49 | 5.28 | 5.45 | 5.68 | 5.72 |
| (CaO + MgO + SrO), wt % | 1.53 | 0.6 | 0.65 | 1.81 | 0.04 | 1.30 | 0.57 | 1.40 | 1.41 |
| Properties | | | | | | | | | |
| T2.3 (logEta = 2.3) | 1430 | 1420 | 1350 | 1207 | | 1425 | 1550 | 1515 | 1550 |
| T4 | 1140.4 | 1146.6 | 1106.8 | 1158.8 | | 1141.7 | 1222.1 | 1203 | 1236.7 |
| Annealing Point | 639.2 | 668 | 683.9 | 657.5 | 799.7 | 652.3 | 692.4 | 662.1 | 654.5 |
| Liquidus | 1155 | 1245 | 1205 | 1290 | 1330 | 1110 | 1440 | 1145 | 1365 |
| Log Liquidus Viscosity | 3.9 | 3.3 | 3.1 | 1.8 | | 4.3 | 2.7 | 4.5 | 2.3 |
| Density | 2.677 | 2.572 | 2.712 | 3.537 | 2.605 | 2.669 | 2.532 | 2.512 | 2.441 |
| Young's modulus | 83.7 | 86.1 | 92 | 99.8 | 89.5 | 86.5 | 84.1 | 83.6 | 80.3 |
| Poisson's ratio | 0.234 | 0.236 | 0.254 | 0.269 | 0.227 | 0.24 | 0.225 | 0.225 | 0.226 |
| E/d, $GPa*cm^3/gram$ | 31.3 | 33.5 | 33.9 | 28.2 | 34.4 | 32.4 | 33.2 | 33.3 | 32.9 |
| CTE 20-300 | 53 | 47.9 | 49 | 67.4 | | 52.7 | 48.4 | 49.6 | 46.3 |
| $K_{ic}$ | 0.801 | 0.871 | 0.881 | 0.836 | | 0.852 | 0.807 | 0.827 | 0.793 |
| Durability HCl 5% w/95 C./24 h, $mg/cm^2$ | 7.23 | 11.32 | 35.7 | | | 26.8 | 4.74 | 2.52 | 2.12 |
| Durability NaOH 5% w/95C./6 h, $mg/cm^2$ | 1.59 | 1.31 | 1.11 | 0.3 | | 1.41 | 1.17 | 0.89 | 1.22 |
| Central tension stress CT (GPa) at ion exchange conditions (T, ° C. and time, hr): | | | | | | | | | |
| 390° C., 16 hr | | | | | | 64 | 100 | 90 | 108 |
| 390° C., 24 hr | 89.7 | 97.8 | 58.2 | | | 75 | 118 | 109 | 126 |
| 390° C., 40 hr | 97.2 | 122.9 | 67.6 | | | | | | |

TABLE 3-continued

| | | | | | | 62 | 95 | 90 | 104 |
|---|---|---|---|---|---|---|---|---|---|
| 430° C., 6 hr | | | | | | | | | |
| 430° C., 16 hr | | | | | | 91 | 116 | 123 | 114 |

| Example # | 10 | 11 | 12 | 13 | 14 | 15 | 16 | 17 | 18 |
|---|---|---|---|---|---|---|---|---|---|
| Mol. % by analysis | | | | | | | | | |
| SiO$_2$ | 65.58 | 68.58 | 67.79 | 67.68 | 68.76 | 69.12 | 68.46 | 67.89 | 63.92 |
| Al$_2$O$_3$ | 15.56 | 13.68 | 14.16 | 14.28 | 13.57 | 13.55 | 13.75 | 13.79 | 19.11 |
| B$_2$O$_3$ | 3.98 | 4.90 | 5.37 | 5.39 | 4.89 | 4.94 | 4.93 | 5.45 | 0 |
| P$_2$O$_5$ | 2.50 | 0.01 | 0 | 0 | 0 | 0.01 | 0.01 | 0.01 | 0 |
| Li$_2$O | 7.04 | 7.49 | 7.02 | 6.99 | 7.46 | 7.07 | 7.03 | 7.03 | 9.24 |
| Na$_2$O | 2.22 | 2.20 | 2.20 | 2.19 | 2.21 | 2.19 | 2.20 | 2.21 | 4.01 |
| K$_2$O | 0 | 0 | 0 | 0 | 0 | 0 | 0 | 0 | 0.04 |
| MgO | 0.98 | 0.98 | 0.98 | 0.97 | 0.97 | 0.97 | 0.98 | 0.98 | 0.02 |
| CaO | 1.00 | 0.51 | 0.52 | 0.52 | 0.51 | 0.02 | 1.00 | 1.01 | 0.03 |
| Y$_2$O$_3$ | 1.01 | 1.02 | 1.82 | 0.62 | 1.51 | 2.00 | 1.50 | 1.51 | 3.52 |
| La$_2$O$_3$ | 0 | 0.51 | 0 | 1.23 | 0 | 0 | 0 | 0 | 0 |
| CeO$_2$ | 0 | 0 | 0 | 0.01 | 0 | 0 | 0 | 0 | 0 |
| ZrO$_2$ | 0 | 0 | 0 | 0 | 0 | 0 | 0 | 0 | 0 |
| TiO$_2$ | 0 | 0 | 0 | 0 | 0 | 0 | 0 | 0 | 0 |
| SnO$_2$ | 0.10 | 0.10 | 0.10 | 0.11 | 0.10 | 0.10 | 0.10 | 0.10 | 0.07 |
| Composition ratios (mol. %) | | | | | | | | | |
| R$_2$O | 9.25 | 9.69 | 9.22 | 9.18 | 9.67 | 9.26 | 9.24 | 9.24 | 13.29 |
| Al$_2$O$_3$ − R$_2$O | 6.31 | 3.99 | 4.94 | 5.10 | 3.90 | 4.29 | 4.51 | 4.55 | 5.82 |
| Al$_2$O$_3$ − R$_2$O − RO | 4.32 | 2.50 | 3.44 | 3.61 | 2.42 | 3.30 | 2.53 | 2.56 | 5.76 |
| Al$_2$O$_3$ − R$_2$O − RO − P$_2$O$_5$ | 1.82 | 2.49 | 3.44 | 3.60 | 2.42 | 3.29 | 2.53 | 2.56 | 5.76 |
| SiO$_2$ + P$_2$O$_5$ | 68.08 | 68.59 | 67.79 | 67.68 | 68.76 | 69.13 | 68.47 | 67.90 | 63.92 |
| REmOn | 1.01 | 1.53 | 1.82 | 1.85 | 1.51 | 2.00 | 1.50 | 1.51 | 3.52 |
| SiO$_2$ + B$_2$O$_3$ + P$_2$O$_5$ | 72.07 | 73.48 | 73.17 | 73.07 | 73.65 | 74.06 | 73.39 | 73.34 | 63.92 |
| Wt % by analysis | | | | | | | | | |
| SiO$_2$ | 57.53 | 61.50 | 60.47 | 59.19 | 62.20 | 61.64 | 61.77 | 61.17 | 53.99 |
| Al$_2$O$_3$ | 23.16 | 20.82 | 21.44 | 21.19 | 20.83 | 20.51 | 21.05 | 21.08 | 27.39 |
| B$_2$O$_3$ | 4.05 | 5.09 | 5.55 | 5.46 | 5.13 | 5.10 | 5.15 | 5.69 | 0 |
| P$_2$O$_5$ | 5.19 | 0.01 | 0.01 | 0.01 | 0.01 | 0.01 | 0.01 | 0.01 | 0 |
| Li$_2$O | 3.07 | 3.34 | 3.11 | 3.04 | 3.36 | 3.13 | 3.16 | 3.15 | 3.88 |
| Na$_2$O | 2.00 | 2.04 | 2.03 | 1.98 | 2.06 | 2.01 | 2.05 | 2.06 | 3.50 |
| K$_2$O | 0 | 0 | 0 | 0 | 0 | 0 | 0 | 0 | 0.06 |
| MgO | 0.58 | 0.59 | 0.59 | 0.57 | 0.59 | 0.58 | 0.59 | 0.59 | 0.01 |
| CaO | 0.82 | 0.43 | 0.43 | 0.42 | 0.43 | 0.02 | 0.85 | 0.85 | 0.03 |
| Y$_2$O$_3$ | 3.33 | 3.43 | 6.09 | 2.04 | 5.12 | 6.72 | 5.10 | 5.12 | 11.16 |
| La$_2$O$_3$ | 0 | 2.47 | 0 | 5.82 | 0 | 0 | 0 | 0 | 0 |
| CeO$_2$ | 0 | 0.01 | 0 | 0.02 | 0 | 0 | 0 | 0 | 0 |
| ZrO$_2$ | 0 | 0 | 0 | 0 | 0 | 0 | 0 | 0 | 0 |
| TiO$_2$ | 0 | 0 | 0 | 0 | 0 | 0 | 0 | 0 | 0 |
| SnO$_2$ | 0.23 | 0.23 | 0.23 | 0.24 | 0.23 | 0.23 | 0.23 | 0.23 | 0.14 |
| Composition ratios (wt %) | | | | | | | | | |
| R$_2$O, wt % | 5.08 | 5.38 | 5.14 | 5.02 | 5.42 | 5.15 | 5.21 | 5.21 | 7.43 |
| (CaO + MgO + SrO), wt % | 1.40 | 1.02 | 1.02 | 0.99 | 1.02 | 0.60 | 1.44 | 1.44 | 0.04 |
| Properties | | | | | | | | | |
| T2.3 (logEta = 2.3) | 1551 | 1553 | 1554 | 1555 | 1556 | 1558 | 1559 | 1560 | 1503 |
| T4 | 1246 | 1231.0 | 1227 | 1220 | 1230 | 1236 | 1232 | 1232 | 1224 |
| Annealing Point | 663 | 651.4 | 658.5 | 650.7 | 657.2 | 668.1 | 656.9 | 649.4 | 734 |
| Liquidus | 1365 | 1170.0 | 1145 | 1140 | 1170 | 1155 | 1135 | 1115 | 1320 |
| Log Liquidus Viscosity | 3.4 | 4.4 | 4.7 | 4.6 | 4.7 | 4.65 | 4.8 | 4.9 | 3.3 |
| Density | 2.416 | 2.5 | 2.455 | 2.493 | 2.437 | 2.459 | 2.443 | 2.442 | 2.617 |
| Young's modulus | 78.9 | 79.8 | 81.2 | 80.3 | 80.1 | 80.9 | 80.8 | 79.8 | 90.4 |
| Poisson's ratio | 0.218 | 0.2 | 0.227 | 0.226 | 0.219 | 0.217 | 0.223 | 0.216 | 0.23 |
| E/d, GPa*cm$^3$/gram | 32.6 | 32.5 | 33.1 | 32.2 | 32.9 | 32.9 | 33.1 | 32.7 | 34.5 |
| CTE 20-300 | 46.6 | 49.4 | 47.6 | 47.7 | 43.3 | 47.9 | 48.1 | 48 | |
| K$_{ic}$ | 0.78 | 0.83 | — | 0.8 | 0.78 | 0.81 | 0.8 | 0.77 | 0.837 |
| Durability HCl 5% w/95° C./24 h, mg/cm$^{\wedge}$2 | 2.17 | 0.29 | 0.55 | 0.63 | 0.26 | 0.27 | 0.31 | 0.39 | |
| Durability NaOH 5% w/95° C./6 h, mg/cm2 | 1.4 | 1.16 | 0.93 | 1.52 | 0.89 | 0.86 | 0.86 | 0.89 | |
| 390° C., 24 hr | 111 | 119 | 101 | 104 | 124 | 112 | 121 | 107 | 158 |
| 430° C., 16 hr | | | | | | | | | 173 |

| Example # | 19 | 20 | 21 | 22 | 23 | 24 | 25 | 26 |
|---|---|---|---|---|---|---|---|---|
| Mol. % by analysis | | | | | | | | |
| SiO$_2$ | 67.74 | 68.85 | 69.02 | 69.22 | 70.69 | 69.17 | 76.79 | 73.92 |
| Al$_2$O$_3$ | 13.75 | 13.11 | 13.02 | 12.88 | 12.12 | 13.05 | 11.52 | 11.52 |
| B$_2$O$_3$ | 5.38 | 5.38 | 5.37 | 5.43 | 5.46 | 5.36 | 0 | 2.87 |
| P$_2$O$_5$ | 0 | 0 | 0 | 0 | 0 | 0 | 0 | |

TABLE 3-continued

| | | | | | | | | |
|---|---|---|---|---|---|---|---|---|
| Li₂O | 6.99 | 7.02 | 7.03 | 7.07 | 6.99 | 6.97 | 7.21 | 7.22 |
| Na₂O | 2.83 | 2.81 | 2.83 | 2.33 | 1.83 | 1.84 | 2.39 | 2.39 |
| K₂O | 0 | 0 | 0 | 0 | 0 | 0 | 0 | 0 |
| MgO | 0.98 | 0.97 | 0.97 | 0.97 | 0.98 | 0.97 | 0.03 | 0.03 |
| CaO | 1.00 | 0.98 | 0.99 | 1.00 | 1.00 | 1.00 | 0 | 0 |
| Y₂O₃ | 0 | 0.36 | 0 | 0.97 | 0 | 0 | 0 | 0 |
| La₂O₃ | 1.19 | 0.40 | 0.64 | 0 | 0.79 | 1.49 | 1.92 | 1.92 |
| CeO₂ | 0.01 | 0 | 0.01 | 0 | 0.01 | 0.01 | 0 | 0 |
| ZrO₂ | 0 | 0 | 0 | 0 | 0 | 0 | 0 | 0 |
| TiO₂ | 0 | 0 | 0 | 0 | 0 | 0 | 0 | 0 |
| SnO₂ | 0.11 | 0.10 | 0.11 | 0.10 | 0.11 | 0.11 | 0.09 | 0.10 |
| Composition ratios (mol. %) | | | | | | | | |
| R₂O | 9.82 | 9.83 | 9.86 | 9.41 | 8.83 | 8.82 | 9.61 | 9.61 |
| Al₂O₃ − R₂O | 3.93 | 3.28 | 3.16 | 3.47 | 3.29 | 4.23 | 1.91 | 1.91 |
| Al₂O₃ − R₂O − RO | 1.95 | 1.33 | 1.20 | 1.50 | 1.32 | 2.26 | 1.88 | 1.87 |
| Al₂O₃ − R₂O − RO − P₂O₅ | 1.95 | 1.33 | 1.20 | 1.50 | 1.32 | 2.26 | 1.88 | 1.87 |
| SiO₂ + P₂O₅ | 67.74 | 68.85 | 69.02 | 69.22 | 70.69 | 69.17 | 76.79 | 73.92 |
| REmOn | 1.20 | 0.76 | 0.65 | 0.97 | 0.79 | 1.50 | 1.92 | 1.92 |
| SiO₂ + B₂O₃ + P₂O₅ | 73.12 | 74.23 | 74.39 | 74.65 | 76.15 | 74.53 | 76.79 | 76.79 |
| Wt % by analysis | | | | | | | | |
| SiO₂ | 60.39 | 62.95 | 63.20 | 63.57 | 64.66 | 61.23 | 67.88 | 65.08 |
| Al₂O₃ | 20.79 | 20.34 | 20.23 | 20.07 | 18.82 | 19.60 | 17.28 | 17.21 |
| B₂O₃ | 5.56 | 5.70 | 5.70 | 5.78 | 5.79 | 5.50 | 0 | 2.93 |
| P₂O₅ | 0 | 0 | 0 | 0 | 0 | 0 | 0 | 0 |
| Li₂O | 3.10 | 3.19 | 3.20 | 3.23 | 3.18 | 3.07 | 3.17 | 3.16 |
| Na₂O | 2.60 | 2.65 | 2.67 | 2.21 | 1.73 | 1.68 | 2.18 | 2.17 |
| K₂O | 0.01 | 0 | 0 | 0 | 0 | 0.01 | 0 | 0 |
| MgO | 0.59 | 0.60 | 0.60 | 0.60 | 0.60 | 0.58 | 0.02 | 0.02 |
| CaO | 0.83 | 0.84 | 0.85 | 0.85 | 0.85 | 0.83 | 0 | 0 |
| Y₂O₃ | 0 | 1.25 | 0 | 3.34 | 0 | 0 | 0 | 0 |
| La₂O₃ | 5.77 | 1.96 | 3.20 | 0.01 | 3.90 | 7.14 | 9.20 | 9.16 |
| CeO₂ | 0.02 | 0.01 | 0.02 | 0 | 0.01 | 0.02 | 0 | 0 |
| ZrO₂ | 0 | 0 | 0 | 0 | 0 | 0 | 0 | 0 |
| TiO₂ | 0 | 0 | 0 | 0 | 0 | 0 | 0 | 0 |
| SnO₂ | 0.24 | 0.24 | 0.25 | 0.24 | 0.25 | 0.24 | 0.21 | 0.21 |
| Composition ratios (wt %) | | | | | | | | |
| R₂O, wt % | 5.70 | 5.84 | 5.88 | 5.44 | 4.91 | 4.75 | 5.35 | 5.33 |
| (CaO + MgO + SrO), wt % | 1.42 | 1.43 | 1.44 | 1.45 | 1.45 | 1.40 | 0.02 | 0.02 |
| Properties | | | | | | | | |
| T2.3 (logEta = 2.3) | | | | | | | | |
| T4 | | | | | | | | |
| Annealing Point | 639 | 634.4 | 634.8 | 649.2 | 637.8 | 643.1 | 729 | 674.2 |
| Liquidus | 1135 | 1145 | 1155 | 1155 | 1160 | 1155 | 1255 | 1210 |
| Log Liquidus Viscosity | | | | | | | | |
| Density | 2.464 | 2.41 | 2.409 | 2.405 | 2.409 | 2.48 | 2.511 | 2.498 |
| Young's modulus | 78.1 | 77.6 | 77.0 | 77.7 | 76.8 | 78.7 | | |
| Poisson's ratio | 0.219 | 0.222 | 0.22 | 0.208 | 0.215 | 0.223 | | |
| E/d, GPa*cm³/gram | 31.7 | 32.2 | 32.0 | 32.3 | 31.9 | 31.7 | | |
| CTE 20-300 | 49.5 | 49.1 | 59.6 | 47.1 | 45.2 | 46.7 | | |
| K$_{ic}$ | 0.801 | 0.79 | 0.778 | 0.811 | 0.786 | 0.792 | | |
| Durability HCl 5% w/95° C./24 h, mg/cm² | 0.5 | 0.2 | 0.2 | 0.2 | 0.1 | 0.2 | | |
| Durability NaOH 5% w/95° C./6 h, mg/cm² | 1.8 | 1.4 | 1.7 | 0.9 | 1.6 | 1.6 | | |
| SOC, Brewster | 3.157 | 3.206 | 3.214 | 3.224 | 3.232 | 3.137 | | |
| Central tension stress CT (GPa) at ion exchange conditions (T, ° C. and time, hr): | | | | | | | | |
| 430° C., 6 hr | 97 | 103 | 99 | 99 | 92 | 90 | | |

| Example # | 27 | 28 | 29 | 30 | 31 | 32 | 33 | 34 | 35 |
|---|---|---|---|---|---|---|---|---|---|
| Mol. % by analysis | | | | | | | | | |
| SiO₂ | 67.31 | 66.33 | 66.95 | 66.17 | 65.96 | 67.17 | 69.03 | 68.40 | 69.23 |
| Al₂O₃ | 13.70 | 13.70 | 13.40 | 13.39 | 13.38 | 13.70 | 11.43 | 12.35 | 11.03 |
| B₂O₃ | 5.61 | 6.08 | 6.58 | 7.07 | 7.07 | 6.07 | 5.50 | 5.50 | 5.50 |
| P₂O₅ | 0.00 | 0.00 | 0.00 | 0.00 | 0.00 | 0.00 | 0.00 | 0.00 | 0.00 |
| Li₂O | 7.07 | 7.11 | 7.06 | 7.07 | 7.07 | 7.03 | 6.50 | 6.70 | 6.70 |
| Na₂O | 2.76 | 2.75 | 2.75 | 2.75 | 2.77 | 2.75 | 2.50 | 3.00 | 2.50 |
| K₂O | 0.00 | 0.00 | 0.00 | 0.00 | 0.00 | 0.00 | 0.00 | 0.00 | 0.00 |
| MgO | 1.00 | 1.00 | 0.99 | 1.00 | 1.00 | 0.98 | 1.00 | 1.00 | 1.00 |
| CaO | 1.00 | 0.99 | 0.99 | 0.99 | 0.99 | 0.02 | 1.00 | 0.00 | 1.00 |
| Y₂O₃ | 0 | 0 | 0 | 0 | 0 | 0 | 0 | 0 | 0 |
| La₂O₃ | 1.499 | 1.5 | 1.201 | 1.499 | 1.199 | 1.991 | 1.5 | 1.5 | 1 |
| CeO₂ | 0 | 0 | 0 | 0 | 0 | 0 | 1.5 | 1.5 | 2 |
| ZrO₂ | 0 | 0 | 0 | 0 | 0 | 0 | 0 | 0 | 0 |

TABLE 3-continued

|  |  |  |  |  |  |  |  |  |  |
|---|---|---|---|---|---|---|---|---|---|
| $TiO_2$ | 0 | 0 | 0 | 0 | 0 | 0 | 0 | 0 | 0 |
| $SnO_2$ | 0.01243 | 0.4952 | 0.01275 | 0.01177 | 0.4944 | 0.2481 | 0 | 0 | 0 |
| Composition ratios (mol. %) | | | | | | | | | |
| $R_2O$ | 9.82 | 9.86 | 9.81 | 9.82 | 9.84 | 9.78 | 9.00 | 9.70 | 9.20 |
| $Al_2O_3 - R_2O$ | 3.88 | 3.84 | 3.59 | 3.57 | 3.54 | 3.92 | 2.43 | 2.65 | 1.83 |
| $Al_2O_3 - R_2O - RO$ | 1.88 | 1.86 | 1.60 | 1.58 | 1.54 | 2.92 | 0.43 | 1.65 | −0.18 |
| $Al_2O_3 - R_2O - RO - P_2O_5$ | 1.88 | 1.86 | 1.60 | 1.58 | 1.54 | 2.92 | 0.43 | 1.65 | −0.18 |
| $SiO_2 + P_2O_5$ | 67.31 | 66.33 | 66.95 | 66.17 | 65.96 | 67.17 | 69.03 | 68.40 | 69.23 |
| REmOn | 1.50 | 1.50 | 1.20 | 1.50 | 1.20 | 1.99 | 3.00 | 3.00 | 3.00 |
| $SiO_2 + B_2O_3 + P_2O_5$ | 72.92 | 72.41 | 73.53 | 73.24 | 73.03 | 73.24 | 74.53 | 73.90 | 74.73 |
| Wt % by analysis | | | | | | | | | |
| $SiO_2$ | 60.72 | 59.68 | 60.84 | 59.62 | 59.79 | 59.63 | 56.75 | 55.92 | 55.82 |
| $Al_2O_3$ | 20.99 | 20.94 | 20.69 | 20.52 | 20.65 | 20.69 | 19.73 | 20.94 | 20.07 |
| $B_2O_3$ | 5.75 | 6.26 | 6.85 | 7.32 | 7.37 | 6.19 | 5.42 | 5.39 | 5.37 |
| $P_2O_5$ | 0.00 | 0.00 | 0.00 | 0.00 | 0.00 | 0.00 | 0.00 | 0.00 | 0.00 |
| $Li_2O$ | 3.19 | 3.18 | 3.21 | 3.19 | 3.21 | 3.14 | 2.75 | 2.82 | 2.81 |
| $Na_2O$ | 2.70 | 2.70 | 2.72 | 2.70 | 2.72 | 2.66 | 2.19 | 2.62 | 2.17 |
| $K_2O$ | 0.00 | 0.00 | 0.00 | 0.00 | 0.00 | 0.00 | 0.00 | 0.00 | 0.00 |
| MgO | 0.61 | 0.60 | 0.61 | 0.61 | 0.61 | 0.60 | 0.57 | 0.57 | 0.57 |
| CaO | 0.84 | 0.84 | 0.85 | 0.84 | 0.85 | 0.00 | 0.79 | 0.00 | 0.79 |
| $Y_2O_3$ | 5.09 | 5.08 | 4.10 | 5.09 | 4.10 | 6.69 | 4.79 | 4.77 | 3.17 |
| $La_2O_3$ | 0.00 | 0.00 | 0.00 | 0.00 | 0.00 | 0.00 | 6.91 | 6.88 | 9.14 |
| $CeO_2$ | 0.00 | 0.00 | 0.00 | 0.00 | 0.00 | 0.00 | 0.00 | 0.00 | 0.00 |
| $ZrO_2$ | 0.00 | 0.00 | 0.00 | 0.00 | 0.00 | 0.00 | 0.00 | 0.00 | 0.00 |
| $TiO_2$ | 0.00 | 0.60 | 0.00 | 0.00 | 0.60 | 0.30 | 0.00 | 0.00 | 0.00 |
| $SnO_2$ | 0.11 | 0.11 | 0.11 | 0.11 | 0.11 | 0.11 | 0.11 | 0.11 | 0.11 |
| Composition ratios (wt %) | | | | | | | | | |
| $R_2O$ wt % | 5.89 | 5.88 | 5.94 | 5.89 | 5.92 | 5.80 | 4.94 | 5.43 | 4.98 |
| (CaO + MgO + SrO), wt % | 1.45 | 1.45 | 1.46 | 1.45 | 1.46 | 0.60 | 1.36 | 0.57 | 1.35 |
| Properties | | | | | | | | | |
| T2.3 (logEta = 2.3) | 1570 | 1536 | 1565 | 1533 | 1553 | 1542 | 1500 | 1503 | 1454 |
| T4 | 1220 | 1197 | 1214 | 1191 | 1201 | 1209 | 1179 | 1178 | 1154 |
| Annealing Point | 650.2 | 642.3 | 636 | 635.1 | 626 | 653.8 | 650.6 | 656 | 646.1 |
| Liquidus | 1140 | 1290 | 1125 | 1105 | 1110 | 1145 | 1130 | 1125 | 1135 |
| Log Liquidus Viscosity | 4.6 | 3.4 | 4.7 | 4.7 | 4.7 | 4.5 | 4.4 | 4.5 | 4.2 |
| Density | 2.441 | 2.445 | 2.417 | 2.432 | 2.42 | 2.457 | 2.573 | 2.57 | 2.592 |
| Young's modulus | 79.4 | 79.3 | 78.2 | 77.6 | 77.3 | 79.4 | 82.6 | 82.3 | 82.7 |
| Poisson's ratio | 0.218 | 0.22 | 0.224 | 0.22 | 0.221 | 0.22 | 0.226 | 0.228 | 0.233 |
| E/d, GPa*cm³/gram | 32.5 | 32.4 | 32.3 | 31.9 | 31.9 | 32.3 | 32.1 | 32.0 | 31.9 |
| CTE 20-300 | 49 | 49.7 | 49.3 | 49.6 | 50.0 | 48.6 | 50.5 | 49.9 | 50.8 |
| $K_{ic}$ | 0.812 | 0.817 | 0.816 | 0.809 | 0.806 | 0.841 | 0.837 | 0.836 | 0.811 |
| Durability HCl 5% w/95° C./24 h, mg/cm² | 0.52 | 0.59 | 0.69 | 1.17 | 0.98 | 0.71 | 1.65 | 2.83 | 2.42 |
| Durability NaOH 5% w/95° C./6 h, mg/cm² | 0.88 | 0.97 | 0.98 | 1.17 | 1.13 | 1.02 | 1.05 | 1.29 | 1.16 |
| SOC, Brewster | 3.143 | 3.168 | 3.208 | 3.208 | 3.225 | 3.151 | 2.986 | 3.004 | 2.975 |

| Example # | 36 | 37 | 38 | 35 | 36 | 37 | 38 | 39 | 40 |
|---|---|---|---|---|---|---|---|---|---|
| Mol. % by analysis | | | | | | | | | |
| $SiO_2$ | 68.70 | 69.13 | 68.03 | 69.23 | 68.70 | 69.13 | 68.03 | 64.74 | 61.58 |
| $Al_2O_3$ | 11.55 | 11.93 | 12.73 | 11.03 | 11.55 | 11.93 | 12.73 | 16.43 | 15.85 |
| $B_2O_3$ | 5.50 | 5.40 | 5.40 | 5.50 | 5.50 | 5.40 | 5.40 | 2 | 7.63 |
| $P_2O_5$ | 0.00 | 0.00 | 0.00 | 0.00 | 0.00 | 0.00 | 0.00 | 0 | 3.94 |
| $Li_2O$ | 6.70 | 7.50 | 8.20 | 6.70 | 6.70 | 7.50 | 8.20 | 8.07 | 7.85 |
| $Na_2O$ | 2.50 | 3.00 | 3.10 | 2.50 | 2.50 | 3.00 | 3.10 | 3.08 | 1.06 |
| $K_2O$ | 0.00 | 0.00 | 0.00 | 0.00 | 0.00 | 0.00 | 0.00 | 0.03 | 0.21 |
| MgO | 1.00 | 0.00 | 0.00 | 1.00 | 1.00 | 0.00 | 0.00 | 5.49 | 1.87 |
| CaO | 1.00 | 0.00 | 0.00 | 1.00 | 1.00 | 0.00 | 0.00 | 0.05 | 0.06 |
| $Y_2O_3$ | 0 | 0 | 0 | 0 | 0 | 0 | 0 | 0 | 0 |
| $La_2O_3$ | 1.5 | 1.5 | 1.5 | 1 | 1.5 | 1.5 | 1.5 | 0 | 0 |
| $CeO_2$ | 1.5 | 1.5 | 1 | 2 | 1.5 | 1.5 | 1 | 0 | 0 |
| $ZrO_2$ | 0 | 0 | 0 | 0 | 0 | 0 | 0 | 0 | 0 |
| $TiO_2$ | 0 | 0 | 0 | 0 | 0 | 0 | 0 | 0 | 0 |
| $SnO_2$ | 0 | 0 | 0 | 0 | 0 | 0 | 0 | 0.10 | 0.08 |
| Composition ratios (mol. %) | | | | | | | | | |
| $R_2O$ | 9.20 | 10.50 | 11.30 | 9.20 | 9.20 | 10.50 | 11.30 | 11.18 | 9.11 |
| $Al_2O_3 - R_2O$ | 2.35 | 1.43 | 1.43 | 1.83 | 2.35 | 1.43 | 1.43 | 5.25 | 6.74 |
| $Al_2O_3 - R_2O - RO$ | 0.35 | 1.43 | 1.43 | −0.18 | 0.35 | 1.43 | 1.43 | −0.29 | 4.74 |
| $Al_2O_3 - R_2O - RO - P_2O_5$ | 0.35 | 1.43 | 1.43 | −0.18 | 0.35 | 1.43 | 1.43 | −0.29 | 0.79 |
| $SiO_2 + P_2O_5$ | 68.70 | 69.13 | 68.03 | 69.23 | 68.70 | 69.13 | 68.03 | 64.74 | 65.52 |
| REmOn | 3.00 | 3.00 | 2.50 | 3.00 | 3.00 | 3.00 | 2.50 | 0 | 0 |
| $SiO_2 + B_2O_3 + P_2O_5$ | 74.20 | 74.53 | 73.43 | 74.73 | 74.20 | 74.53 | 73.43 | 66.74 | 73.15 |

TABLE 3-continued

| Wt % by analysis | | | | | | | | | |
|---|---|---|---|---|---|---|---|---|---|
| SiO$_2$ | 56.48 | 56.72 | 57.65 | 55.82 | 56.48 | 56.72 | 57.65 | 61.30 | 54.36 |
| Al$_2$O$_3$ | 19.90 | 20.41 | 20.93 | 20.07 | 19.90 | 20.41 | 20.93 | 26.08 | 23.74 |
| B$_2$O$_3$ | 5.42 | 5.31 | 5.42 | 5.37 | 5.42 | 5.31 | 5.42 | 2.07 | 7.80 |
| P$_2$O$_5$ | 0.00 | 0.00 | 0.00 | 0.00 | 0.00 | 0.00 | 0.00 | 0.09 | 8.22 |
| Li$_2$O | 2.83 | 3.16 | 3.53 | 2.81 | 2.83 | 3.16 | 3.53 | 3.69 | 3.45 |
| Na$_2$O | 2.19 | 2.62 | 2.77 | 2.17 | 2.19 | 2.62 | 2.77 | 2.88 | 0.96 |
| K$_2$O | 0.00 | 0.00 | 0.00 | 0.00 | 0.00 | 0.00 | 0.00 | 0.07 | 0.04 |
| MgO | 0.57 | 0.00 | 0.00 | 0.57 | 0.57 | 0.00 | 0.00 | 3.41 | 1.11 |
| CaO | 0.79 | 0.00 | 0.00 | 0.79 | 0.79 | 0.00 | 0.00 | 0.06 | 0.05 |
| Y$_2$O$_3$ | 4.79 | 4.78 | 4.89 | 3.17 | 4.79 | 4.78 | 4.89 | 0 | 0 |
| La$_2$O$_3$ | 6.91 | 6.90 | 4.70 | 9.14 | 6.91 | 6.90 | 4.70 | 0 | 0 |
| CeO$_2$ | 0.00 | 0.00 | 0.00 | 0.00 | 0.00 | 0.00 | 0.00 | 0 | 0 |
| ZrO$_2$ | 0.00 | 0.00 | 0.00 | 0.00 | 0.00 | 0.00 | 0.00 | 0 | 0 |
| TiO$_2$ | 0.00 | 0.00 | 0.00 | 0.00 | 0.00 | 0.00 | 0.00 | 0 | 0 |
| SnO$_2$ | 0.11 | 0.11 | 0.11 | 0.11 | 0.11 | 0.11 | 0.11 | 0.24 | 0.19 |
| Composition ratios (wt %) | | | | | | | | | |
| R$_2$O, wt % | 5.02 | 5.79 | 6.31 | 4.98 | 5.02 | 5.79 | 6.31 | 6.64 | 4.45 |
| (CaO + MgO + SrO), wt % | 1.36 | 0.00 | 0.00 | 1.35 | 1.36 | 0.00 | 0.00 | 3.47 | 1.16 |
| Properties | | | | | | | | | |
| T2.3 (logEta = 2.3) | 1498 | 1520 | 1529 | 1454 | 1498 | 1520 | 1529 | 1551 | 1547 |
| T4 | 1178 | 1189 | 1191 | 1154 | 1178 | 1189 | 1191 | 1220 | 1211 |
| Annealing Point | 650.4 | 654.7 | 647.5 | 646.1 | 650.4 | 654.7 | 647.5 | 664.9 | 603.9 |
| Liquidus | 1135 | 1140 | 1160 | 1135 | 1135 | 1140 | 1160 | 1250 | 1210 |
| Log Liquidus Viscosity | 4.3 | 4.4 | 4.2 | 4.2 | 4.3 | 4.4 | 4.2 | 3.8 | 4.0 |
| Density | 2.576 | 2.56 | 2.518 | 2.592 | 2.576 | 2.56 | 2.518 | 2.429 | 2.325 |
| Young's modulus | 82.7 | 80.9 | 80.6 | 82.7 | 82.7 | 80.9 | 80.6 | 85.6 | 72.3 |
| Poisson's ratio | 0.232 | 0.226 | 0.227 | 0.233 | 0.232 | 0.226 | 0.227 | 0.225 | 0.221 |
| E/d, GPa*cm$^3$/gram | 32.1 | 31.6 | 32.0 | 31.9 | 32.1 | 31.6 | 32.0 | 35.3 | 31.1 |
| CTE 20-300 | 51.1 | 53.1 | 55.2 | 50.8 | 51.1 | 53.1 | 55.2 | 51.9 | 42.1 |
| K$_{ic}$ | 0.849 | 0.826 | 0.839 | 0.811 | 0.849 | 0.826 | 0.839 | 0.824 | 0.74 |
| Durability HCl 5% w/95° C./24 h, mg/cm$^2$ | 2.41 | 1.73 | 1.63 | 2.42 | 2.41 | 1.73 | 1.63 | 0.61 | 10.55 |
| Durability NaOH 5% w/95° C./6 h, mg/cm$^2$ | 1.16 | 1.31 | 1.33 | 1.16 | 1.16 | 1.31 | 1.33 | 2.06 | 6.23 |
| SOC, Brewster | 2.988 | 3.042 | 3.076 | 2.975 | 2.988 | 3.042 | 3.076 | 2.943 | 3.394 |
| 390° C., 24 hr | | | | | | | | | 98 |
| 430° C., 8 hr | | | | | | | | | 90 |

| Example # | 41 | 42 | 43 |
|---|---|---|---|
| Mol. % by analysis | | | |
| SiO$_2$ | 65.33 | 70.34 | 68.17 |
| Al$_2$O$_3$ | 15.82 | 10.42 | 12.63 |
| B$_2$O$_3$ | 5.04 | 2.93 | 6.07 |
| P$_2$O$_5$ | 2.61 | 5.88 | 3.04 |
| Li$_2$O | 9.87 | 7.24 | 7.97 |
| Na$_2$O | 1.06 | 2.54 | 2.02 |
| K$_2$O | 0.19 | 0.54 | 0 |
| MgO | 0 | 0.03 | 0.03 |
| CaO | 0.06 | 0.01 | 0.01 |
| Y$_2$O$_3$ | 0 | 0.00 | 0 |
| La$_2$O$_3$ | 0 | 0.00 | 0 |
| CeO$_2$ | 0 | 0.00 | 0 |
| ZrO$_2$ | 0 | 0.00 | 0 |
| TiO$_2$ | 0 | 0.01 | 0.01 |
| SnO$_2$ | 0.08 | 0.05 | 0.05 |
| Composition ratios (mol. %) | | | |
| R$_2$O | 11.12 | 10.32 | 9.98 |
| Al$_2$O$_3$ − R$_2$O | 4.71 | 0.10 | 2.65 |
| Al$_2$O$_3$ − R$_2$O − RO | 4.69 | 0.05 | 2.60 |
| Al$_2$O$_3$ − R$_2$O − RO − P$_2$O$_5$ | 2.08 | −5.83 | −0.43 |
| SiO$_2$ + P$_2$O$_5$ | 67.94 | 76.22 | 71.21 |
| REmOn | 0 | 0.00 | 0.00 |
| SiO$_2$ + B$_2$O$_3$ + P$_2$O$_5$ | 72.98 | 79.15 | 77.28 |
| Wt % by analysis | | | |
| SiO$_2$ | 59.04 | 62.49 | 61.95 |
| Al$_2$O$_3$ | 24.28 | 15.71 | 19.48 |
| B$_2$O$_3$ | 5.28 | 3.02 | 6.39 |
| P$_2$O$_5$ | 5.58 | 12.34 | 6.52 |
| Li$_2$O | 4.44 | 3.20 | 3.60 |
| Na$_2$O | 0.99 | 2.33 | 1.89 |
| K$_2$O | 0.05 | 0.75 | 0 |
| MgO | 0.02 | 0.02 | 0.02 |

TABLE 3-continued

| | | | |
|---|---|---|---|
| CaO | 0.05 | 0.01 | 0.01 |
| $Y_2O_3$ | 0 | 0.00 | 0 |
| $La_2O_3$ | 0 | 0.00 | 0 |
| $CeO_2$ | 0 | 0.00 | 0 |
| $ZrO_2$ | 0 | 0.00 | 0 |
| $TiO_2$ | 0 | 0.01 | 0.01 |
| $SnO_2$ | 0.18 | 0.11 | 0.11 |
| Composition ratios (wt %) | | | |
| $R_2O$, wt % | 5.47 | 6.28 | 5.49 |
| (CaO + MgO + SrO), wt % | 0.07 | 0.03 | 0.03 |
| Properties | | | |
| T2.3 (logEta = 2.3) | 1601 | 1776 | 1692 |
| T4 | 1261 | 1377 | 1320 |
| Annealing Point | 626.8 | 596.5 | 619.9 |
| Liquidus | 1265 | 1185 | 1110 |
| Log Liquidus Viscosity | 4.0 | 5.15 | 5.47 |
| Density | 2.335 | 2.284 | 2.293 |
| Young's modulus | 74.7 | 68.4 | 69.9 |
| Poisson's ratio | 0.216 | 0.19 | 0.21 |
| E/d, GPa*cm$^3$/gram | 32.0 | 30.0 | 30.5 |
| CTE 20-300 | 46.5 | 49.3 | 44.8 |
| $K_{ic}$ | 0.746 | | |
| Durability HCl 5% w/95° C./24 h, mg/cm$^2$ | 2.13 | | |
| Durability NaOH 5% w/95° C./6 h, mg/cm$^2$ | 4.01 | | |
| SOC, Brewster | 3.304 | 3.343 | 3.487 |
| Central tension stress CT (GPa) at ion exchange conditions (T, ° C. and time, hr): | | | |
| 390° C., 24 hr | 147 | | |
| 430° C., 8 hr | 154 | | |

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

As used herein, a trailing 0 in a number is intended to represent a significant digit for that number. For example, the number "1.0" includes two significant digits, and the number "1.00" includes three significant digits.

What is claimed is:

1. A glass composition comprising:
   from greater than or equal to 50.0 mol % to less than or equal to 65.0 mol % $SiO_2$;
   from greater than or equal to 14.0 mol % and less than or equal to 25.0 mo.% $Al_2O_3$;
   from greater than or equal to 7.2 mol % to less than or equal to 10.0 mol % $Li_2O+Na_2O$;
   greater than or equal to 7.2 mol % $Li_2O$;
   from greater than or equal to 0.0 mol % to less than or equal to 3.0 mol % $P_2O_5$; and
   from greater than or equal to 0.0 mol % to less than or equal to 8.0 mol % alkaline earth metals, wherein the glass composition is essentially free of F and oxides of $As_2O_3$, $Sb_2O_3$, K, Zr, Ti, Pb and Ta.

2. A glass composition of claim 1, wherein the difference $Al_2O_3-(Li_2O+Na_2O+K_2O)$, calculated on molar basis, is greater than or equal to 7.0 mol %.

3. A glass composition of claim 1, wherein the difference $Al_2O_3-(Li_2O+Na_2O+K_2O+RO)$, calculated on molar basis, is greater than or equal to 3.0 mol %, wherein RO is the total sum of divalent metal oxides.

4. A glass composition of claim 1, wherein the difference $Al_2O_3-(R_2O+RO+P_2O_5)$, calculated on molar basis, is greater than or equal to 2.5 mol %, wherein $R_2O$ is the total sum of alkali metal oxides and RO is the total sum of divalent metal oxides.

5. A glass composition of claim 1, wherein the glass composition comprises:
   a liquidus viscosity of at least about 1000 Poises;
   a Young's modulus of at least about 80 GPa;
   a 200 P temperature of less than or equal to 1650° C.;
   an annealing point greater than or equal to 600° C.;
   a specific modulus of at least 30 GPa·cm$^3$/gram; and
   a fracture toughness of greater than or equal to 0.78 MPa·m$^{1/2}$.

6. The glass composition of claim 1, wherein the glass composition has a liquidus viscosity of greater than or equal to 10000 Poises, and a 200 P temperature less than 1450° C.

7. A glass composition of claim 1, wherein the glass composition comprises from greater than or equal to 0.0 mol % to less than or equal to 15.0 mol % rare earth oxides.

8. A glass composition comprising:
   from greater than or equal to 50.0 mol % to less than or equal to 65.0 mol % $SiO_2$;
   from greater than or equal to 12.0 mol % to less than or equal to 20.0 mol % $Al_2O_3$; from greater than or equal to 7.2 mol % to less than or equal to 10.0 mol % $Li_2O+Na_2O$, and
   from greater than or equal to 6.5 mol % to less than or equal to 10.0 mol % $Li_2O$, wherein the glass composition is essentially free of $As_2O_3$, $Sb_2O_3$, $ZrO_2$ and $TiO_2$, and the difference $Al_2O_3-(Li_2O+Na_2O+K_2O+RO)$, calculated on a molar basis, is greater than or equal to 4.5 mol %, wherein RO is the total sum of divalent metal oxides.

9. A glass composition of claim 8, wherein the difference $Al_2O_3-R_2O-RO(R_2O+RO)$, calculated on molar basis, is greater than or equal to 7.5 mol %, wherein $R_2O$ is the total sum of alkali metal oxides and RO is the total sum of divalent metal oxides.

10. A glass composition of claim 8, wherein the glass composition comprises greater than or equal to 7.0 mol % $Li_2O$.

11. A glass composition of claim 8, wherein the difference $Al_2O_3-(R_2O+RO+P_2O_5)$, calculated on molar basis, is greater than or equal to 4.0 mol %, wherein $R_2O$ is the total sum of alkali metal oxides and RO is the total sum of divalent metal oxides.

12. A glass composition of claim 8, wherein the glass composition from greater than or equal to 0.0 mol % to less than or equal to 15.0 mol % rare earth oxides.

13. A glass composition of claim 8, wherein the glass composition comprises:
 a liquidus viscosity of greater than or equal to 1000 Poises;
 a Young's modulus of greater than or equal to 86 GPa;
 a 200 P temperature of less than or equal to 1420° C.; and
 an annealing point of greater than or equal to 660° C.

14. A glass composition of claim 13, wherein the glass composition comprises:
 a specific modulus of greater than or equal to 33 GPa·cm³/gram, and
 a fracture toughness of greater than or equal to 0.87 MPa·m$^{1/2}$.

15. A glass composition comprising:
 from greater than or equal to 50.0 mol % to less than or equal to 66.0 mol % $SiO_2$;
 less than or equal to 20.0 mol % $Al_2O_3$; from greater than or equal to 7.2 mol % to less than or equal to 10.0 mol % $Li_2O+Na_2O$, and
 from greater than or equal to 6.5 mol % to less than or equal to 10.0 mol % $Li_2O$, wherein
 the glass composition is essentially free of $As_2O_3$, $Sb_2O_3$, $ZrO_2$, $TiO_2$, and F,
 the difference $Al_2O_3-(Li_2O+Na_2O+K_2O+RO+P_2O_5)$, calculated on molar basis, is greater than or equal to 2.5 mol %, where RO is the total sum of divalent metal oxides, and
 an amount of $B_2O_3$ does not exceed the amount of $Li_2O$, wherein the glass composition comprises:
  a 200 P temperature of less than or equal to 1420° C.; and
  an annealing point of greater than or equal to 660° C.

16. A glass composition of claim 15, wherein the glass composition comprises:
 a liquidus viscosity of greater than or equal to 1000 Poises; and
 a Young's modulus of greater than or equal to 86 GPa.

17. A glass composition of claim 16, wherein the glass composition comprises:
 a specific modulus of greater than or equal to 33 GPa·cm³/gram; and
 a fracture toughness of greater than or equal to 0.87 MPa·m$^{1/2}$.

18. A glass composition of claim 14, wherein the glass composition comprises from greater than or equal to 0.0 mol % to less than or equal to 15.0 mol % rare earth oxides.

19. A glass composition of claim 14, wherein the glass composition comprises from greater than or equal to 7.0 mol % to less than or equal to 10.0 mol % $Li_2O$.

* * * * *

UNITED STATES PATENT AND TRADEMARK OFFICE
CERTIFICATE OF CORRECTION

| | | |
|---|---|---|
| PATENT NO. | : 11,292,741 B2 | Page 1 of 1 |
| APPLICATION NO. | : 16/705402 | |
| DATED | : April 5, 2022 | |
| INVENTOR(S) | : Matthew John Dejneka et al. | |

It is certified that error appears in the above-identified patent and that said Letters Patent is hereby corrected as shown below:

On the Title Page

Item (72), in Column 1, in "Inventor", Line 3, delete "Chungchongnam-do" and insert
-- Chungcheongnam-do --.

On the page 2, item (56), in Column 2, under "Other Publications", Line 3, delete "(1999." and
insert -- (1999). --.

On the page 2, item (56), in Column 2, under "Other Publications", Line 6, delete "(1954." and insert
-- (1954). --.

In the Claims

In Column 45, Line 55, in Claim 1, delete "mo.%" and insert -- mol % --.

In Column 47, Line 5, in Claim 9, delete "Al$_2$O$_3$-R$_2$O-RO(R$_2$O+RO)," and insert
-- Al$_2$O$_3$-(R$_2$O+RO), --.

Signed and Sealed this
Twenty-fourth Day of June, 2025

Coke Morgan Stewart
*Acting Director of the United States Patent and Trademark Office*